US012694087B2

(12) United States Patent
Lee et al.

(10) Patent No.: US 12,694,087 B2
(45) Date of Patent: Jul. 28, 2026

(54) IDENTITY AUTHENTICATION REQUEST METHOD, IDENTITY AUTHENTICATION REQUEST DEVICE, AND IDENTITY AUTHENTICATION SYSTEM

(71) Applicant: GHOST PASS INC., Gwangju (KR)

(72) Inventors: Seon Gwan Lee, Gwangju (KR);
Seung Jin Koo, Las Vegas, NV (US)

(73) Assignee: GHOST PASS INC., Gwangju (KR)

( * ) Notice: Subject to any disclaimer, the term of this patent is extended or adjusted under 35 U.S.C. 154(b) by 17 days.

(21) Appl. No.: 18/845,426

(22) PCT Filed: Jan. 17, 2024

(86) PCT No.: PCT/KR2024/000817
§ 371 (c)(1),
(2) Date: Sep. 9, 2024

(87) PCT Pub. No.: WO2024/155090
PCT Pub. Date: Jul. 25, 2024

(65) Prior Publication Data
US 2025/0209150 A1 Jun. 26, 2025

(30) Foreign Application Priority Data

| Jan. 17, 2023 | (KR) | .......................... | 10-2023-0006939 |
| Apr. 18, 2023 | (KR) | .......................... | 10-2023-0051003 |
| Jan. 16, 2024 | (KR) | .......................... | 10-2024-0006977 |

(51) Int. Cl.
*G06F 21/34* (2013.01)
*G06F 21/45* (2013.01)
*G06F 21/60* (2013.01)

(52) U.S. Cl.
CPC .............. *G06F 21/34* (2013.01); *G06F 21/45* (2013.01); *G06F 21/604* (2013.01)

(58) Field of Classification Search
CPC .. H04M 1/6016; H04M 1/67; G06Q 20/3224; G06Q 20/3272; G06Q 20/3278;
(Continued)

(56) References Cited

U.S. PATENT DOCUMENTS

| 2017/0006035 A1 | 1/2017 | Gilberton et al. |
| 2020/0050749 A1* | 2/2020 | Barboi .................. H04W 12/00 |

(Continued)

FOREIGN PATENT DOCUMENTS

| JP | 2012-26223 A | 2/2012 |
| JP | 2015-194936 A | 11/2015 |

(Continued)

*Primary Examiner* — Izunna Okeke
(74) *Attorney, Agent, or Firm* — PnK IP LLC

(57) ABSTRACT

The present disclosure relates to an identity authentication request method, an identity authentication request device, and an identity authentication system. An identity authentication request method, according to one embodiment of the present disclosure, includes the steps of: transmitting a prearranged sound signal, receiving device identification data transmitted from a device that has detected the prearranged sound signal, and transmitting collected authentication means data to a device identified by the device identification data.

9 Claims, 19 Drawing Sheets

(58) Field of Classification Search
CPC ....... G06Q 20/40155; G06Q 20/40145; G07C
9/26; G09C 5/00; H04B 11/00; H04L
9/32; H04L 9/40; H04L 63/0869; H04L
63/0876; H04L 63/0884; H04W 12/06;
H04W 12/63; H04W 12/65
See application file for complete search history.

(56) References Cited

U.S. PATENT DOCUMENTS

| | | | |
|---|---|---|---|
| 2021/0153014 | A1 | 5/2021 | Vanpariya et al. |
| 2022/0058256 | A1 | 2/2022 | Lee |
| 2022/0108324 | A1* | 4/2022 | Lee .................... G06Q 20/3227 |
| 2022/0158745 | A1 | 5/2022 | Cirit |

FOREIGN PATENT DOCUMENTS

| | | |
|---|---|---|
| JP | 2019-120016 A | 7/2019 |
| JP | 7015408 | 2/2022 |
| JP | 2022069776 | 5/2022 |
| KR | 10-2014-0029990 | 3/2014 |
| KR | 10-2014-0121222 | 10/2014 |
| KR | 10-2015-0013927 | 2/2015 |
| KR | 10-1575687 | 12/2015 |
| KR | 10-2017-0004108 | 1/2017 |
| KR | 10-2018-0021502 | 3/2018 |
| KR | 10-2019-0057931 | 5/2019 |
| KR | 10-1978795 | 5/2019 |
| KR | 10-1981604 | 5/2019 |
| KR | 10-2156184 | 9/2020 |
| VN | 10037784 B | * 12/2023 |

* cited by examiner

| | |
|---|---|
| DETECT APPROACHING PERSONS | — 510 |
| COLLECT AUTHENTICATION MEANS DATA | — 520 |
| TRANSMIT PREARRANGED SOUND SIGNAL | — 530 |
| RECEIVE PLURALITY OF PIECES OF DEVICE IDENTIFICATION DATA | — 540 |
| SELECT ONE OF PLURALITY OF PIECES OF DEVICE IDENTIFICATION DATA | — 550 |
| TRANSMIT AUTHENTICATION MEANS DATA TO DEVICE IDENTIFIED BY SELECTED DEVICE IDENTIFICATION DATA | — 560 |
| INITIALIZE STATE | — 570 |

SWITCH TO STATE THAT ENABLES SOUND
SIGNAL TO BE RECEIVED — 710

DETECT SOUND SIGNAL — 720

DETERMINE WHETHER DETECTED SOUND
SIGNAL IS  PREARRANGED SOUND SIGNAL — 730

TRANSMIT DEVICE IDENTIFICATION DATA — 740

RECEIVE AUTHENTICATION MEANS DATA — 750

DETERMINE DATA MATCHING OR
MISMATCHING — 760

TRANSMIT SUCCESS OR FAILURE OF
IDENTITY AUTHENTICATION — 770

Figure 11B:
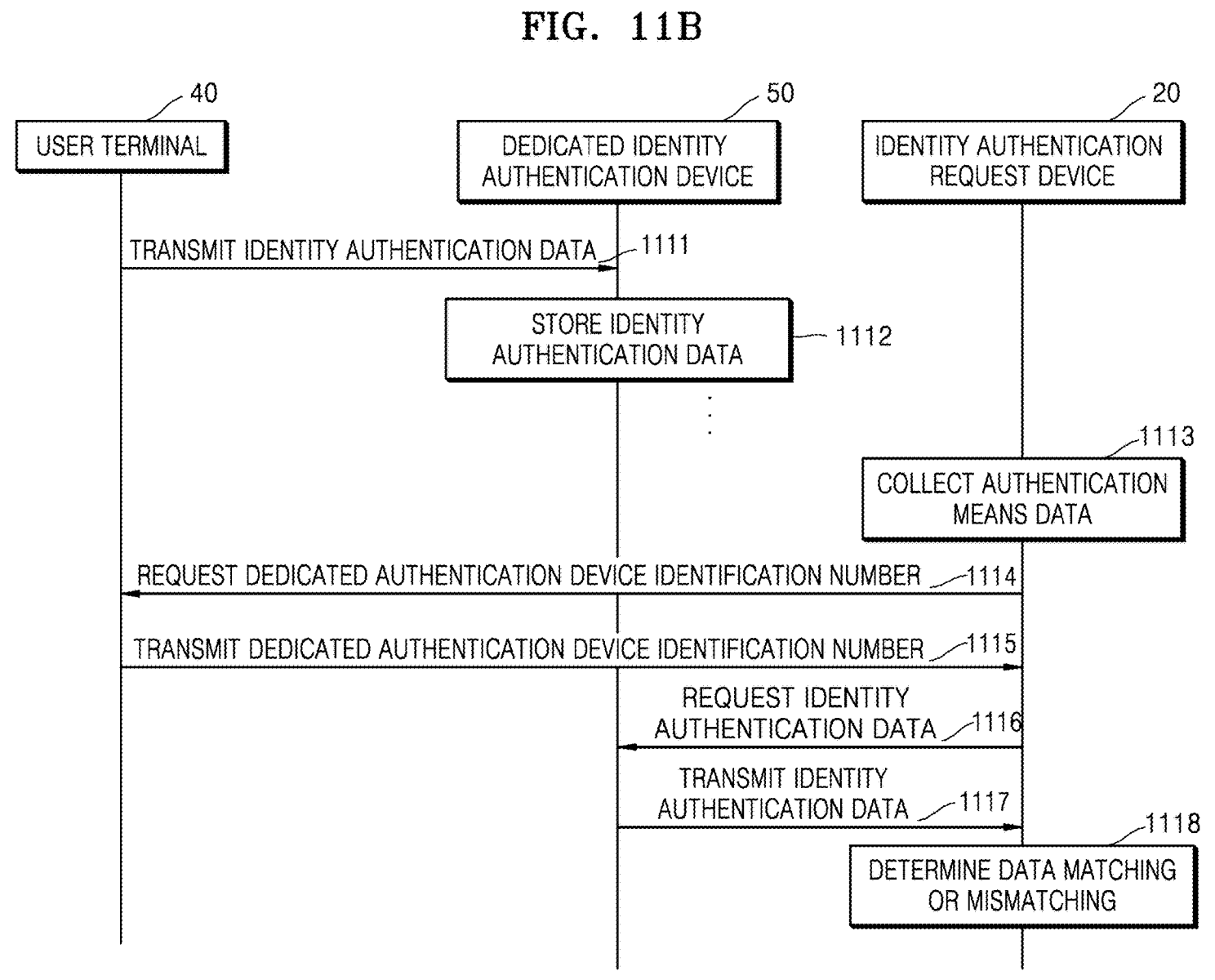

IDENTITY AUTHENTICATION REQUEST DEVICE — 20

DEDICATED IDENTITY AUTHENTICATION DEVICE — 50

USER TERMINAL — 40

TRANSMIT IDENTITY AUTHENTICATION DATA — 1111

STORE IDENTITY AUTHENTICATION DATA — 1112

COLLECT AUTHENTICATION MEANS DATA — 1113

REQUEST DEDICATED AUTHENTICATION DEVICE IDENTIFICATION NUMBER — 1114

TRANSMIT DEDICATED AUTHENTICATION DEVICE IDENTIFICATION NUMBER — 1115

REQUEST IDENTITY AUTHENTICATION DATA — 1116

TRANSMIT IDENTITY AUTHENTICATION DATA — 1117

DETERMINE DATA MATCHING OR MISMATCHING — 1118

IDENTITY AUTHENTICATION REQUEST METHOD, IDENTITY AUTHENTICATION REQUEST DEVICE, AND IDENTITY AUTHENTICATION SYSTEM

CROSS REFERENCE TO RELATED APPLICATIONS

This application is a National Stage Entry of International Patent Application No. PCT/KR2024/000817, filed on Jan. 17, 2024, which claims priority from and the benefit of Korean Patent Application No. 10-2023-0006939, filed on Jan. 17, 2023, Korean Patent Application No. 10-2023-0051003, filed on Apr. 18, 2023, and Korean Patent Application No. 10-2024-0006977, filed on Jan. 16, 2024, each of which is hereby incorporated by reference for all purposes as if fully set forth herein.

BACKGROUND

Field

Embodiments of the invention relate generally to an identity authentication request method, an identity authentication request device, and an identity authentication system.

Discussion of Background

Recently, with the development of smart device technology, including smartphones, and the development of network technology, collecting biometric information through common devices in everyday life, such as smart devices or kiosk, and performing identity authentication through the biometric information to pay for certain products or gaining access has become an experience that may be easily encountered.

On the other hand, since identity authentication is a fundamental procedure for preventing identity theft, security may be said to be the most important factor in identity authentication technology.

Therefore, the development of identity authentication technology capable of providing procedural convenience to users while maintaining high security is continuously required.

The above information disclosed in this Background section is only for understanding of the background of the inventive concepts, and, therefore, it may contain information that does not constitute prior art.

SUMMARY

An object of the present disclosure is to provide an identity authentication request method, an identity authentication request device, and an identity authentication system. The problems to be solved by the present disclosure are not limited to those described above, and other problems and advantages of the present disclosure that are not mentioned herein will be understood from the following description and will be more clearly understood from the embodiments of the present disclosure. In addition, it will be appreciated that the problems to be solved by the present disclosure and the advantages may be realized by the means indicated in the patent claims and combinations thereof.

A first aspect of the present disclosure may provide an identity authentication request method including: transmitting a prearranged sound signal; receiving device identification data transmitted from a device that has detected the prearranged sound signal; and transmitting collected authentication means data to a device corresponding to the device identification data.

A second aspect of the present disclosure may provide an identity authentication request device including: a memory in which at least one program is stored; and a processor configured to be operated by executing the at least one program, wherein the processor is further configured to transmit a prearranged sound signal, receive device identification data transmitted from a device that has detected the prearranged sound signal, and transmit collected authentication means data to a device corresponding to the device identification data.

A third aspect of the present disclosure may provide a computer-readable recording medium having recorded thereon a program for causing a computer to perform the method according to the first aspect.

A fourth aspect of the present disclosure may provide an identity authentication method including: transmitting device identification data in response to detecting a prearranged sound signal; receiving transmitted authentication means data, based on the transmitted device identification data; determining whether the authentication means data matches stored identity authentication data; and transmitting success or failure of identity authentication, based on the matching or mismatching.

A fifth aspect of the present disclosure may provide an identity authentication system including: an identity authentication request device that collects authentication means data and transmits a prearranged sound signal; and a user terminal that detects the prearranged sound signal and transmits stored identity authentication data in response to a request, wherein the identity authentication request device receives the identity authentication data and determines whether the authentication means data matches the identity authentication data.

A sixth aspect of the present disclosure may provide an identity authentication system including: an identity authentication request device that collects authentication means data, transmits a prearranged sound signal, and transmits the authentication means data; a user terminal that detects the prearranged sound signal and transmits an identification number of a dedicated identity authentication device in response to a request; and the dedicated identity authentication device that stores the identity authentication data received from the user terminal and determines whether the authentication means data matches the identity authentication data.

According to various embodiments of the present disclosure, even when a person attempting identity authentication does not directly input identification information of an identity authentication device he/she uses, such as his/her phone number, it may be verified that the person attempting identity authentication is the same person as the owner of the identity authentication device.

Accordingly, the time required for identity authentication may be greatly saved, and high satisfaction may be provided to those who experience the identity authentication system of the present disclosure.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

FIGS. 11A and 11B are flowcharts for describing an identity authentication process according to another embodiment of the present disclosure.

FIGS. 12A, 12B, and 12C are flowcharts for describing an identity authentication process according to another embodiment of the present disclosure.

DETAILED DESCRIPTION

Figure 1:
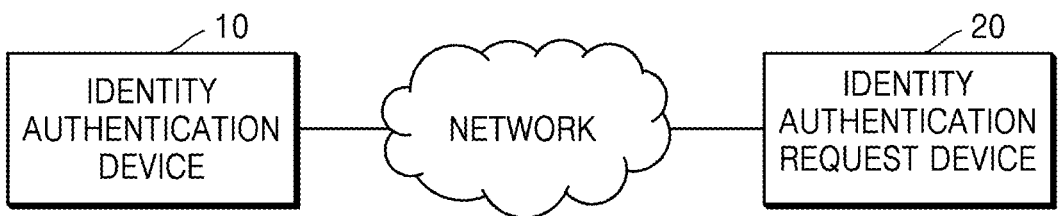
FIG. 1 is a block diagram for describing an identity authentication system according to an embodiment of the present disclosure.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

An identity authentication request method according to an embodiment of the present disclosure may include transmitting a prearranged sound signal, receiving device identification data transmitted from a device that has detected the prearranged sound signal, and transmitting collected authentication means data to a device identified by the device identification data.

The advantages and features of the present disclosure, and methods of achieving them will be clarified with reference to embodiments described below in detail with reference to the accompanying drawings. However, the present disclosure is not limited to the embodiments presented below and may be implemented in various different forms. Rather, it will be understood that the present disclosure includes all modifications, equivalents, and substitutes falling within the concept and technical scope of the present disclosure. The embodiments presented below are provided so that the present disclosure will be thorough and complete and will fully convey the concept of the present disclosure to those of ordinary skill in the art. In describing the present disclosure, when the detailed description of the relevant known technology is determined to obscure the gist of the present disclosure, the detailed description thereof may be omitted.

The terms as used herein are only used to describe particular embodiments and are not intended to limit the present disclosure. The singular forms as used herein are intended to include the plural forms as well unless the context clearly indicates otherwise. The terms "comprise," "include," or "have" as used in the present application are inclusive and therefore specify the presence of one or more stated features, integers, steps, operations, elements, components, or any combination thereof, but do not preclude the presence or addition of one or more other features, integers, steps, operations, elements, components, or any combination thereof.

Some embodiments of the present disclosure may be represented by functional block configurations and various processes. Some or all of such functional blocks may be implemented in any number of hardware and/or software configurations that perform specific functions. For example, the functional blocks of the present disclosure may be implemented by one or more microprocessors or may be implemented by circuit configurations for certain functions. In addition, for example, the functional blocks of the present disclosure may be implemented in various programming or scripting languages. The functional blocks may be implemented as algorithms to be executed by one or more processors. In addition, the present disclosure may employ conventional technologies for electronic environment setting, signal processing, and/or data processing. The terms such as "mechanism," "element," "means," and "configuration" may be used broadly and are not limited to mechanical and physical configurations.

In addition, connecting lines or connecting members illustrated in the drawings are intended to represent functional connections and/or physical or circuit connections. In an actual device, connecting lines or connecting members illustrated in the drawings may represent connections between components by means of a variety of functional, physical, or circuit connections that may be substituted or added.

In the present disclosure, the term "authentication means data" is used to refer to data that serves as an identity authentication means, that is, data input for identity authentication by a person attempting identity authentication and data collected by a specific device. A person attempting identity authentication may input authentication means data so as to gain access to a restricted procedure through identity authentication. Authentication means data may be a specific type of data set to be used to perform identity authentication by a user or a system. For example, authentication means data may include biometric information of a user. In an embodiment, the biometric information may include one or more of fingerprint information, deoxyribonucleic acid (DNA) information, body skeleton information, hand shape information, retina information, iris information, facial information, vein information, electrocardiogram information, handwriting information, gait information, signature information, blood vessel information, sweat gland structure information, voice information, and biomolecules.

In the present disclosure, the term "identity authentication data" is used to refer to a user's own data stored in an identity authentication device by a user of the identity authentication device, that is, data that serves as a standard for determining whether authentication means data is data of a person attempting identity authentication. In other words, the identity authentication device may perform identity authentication by comparing the authentication means data with the identity authentication data stored in the identity authentication device. The type of identity authentication data may be the same as the type of authentication means data. When the authentication means data is the same as the identity authentication data, identity authentication may be performed successfully and access to a restricted procedure through identity authentication may be approved.

On the other hand, in an embodiment, the identity authentication data may be collected through the identity authentication device and stored in the identity authentication device. In other words, the identity authentication data may be data stored by being input to a data input device, such as a camera or a fingerprint input device, which is provided in the identity authentication device, by the user of the identity authentication device for use of the identity authentication device or for identity authentication.

In another embodiment, the identity authentication data may be collected through an identity authentication request device and stored in an identity authentication device. Specifically, the identity authentication data may be collected through an identity authentication request device, transmitted to an identity authentication device (or to an identity authentication device through a server), and stored in the identity authentication device. The identity authentication data stored through this procedure may also be used to perform an identity authentication procedure according to a system of the present disclosure. For example, for the purpose of initial authentication for use of the identity authentication system, the identity authentication device may collect data as a user's "identity authentication data," and thereafter, when a user attempts identity authentication for use of the identity authentication system, the identity authentication device may collect data as a user's "authentication means data." Even when the type of identity authentication data is the same (e.g., facial recognition), the specifications of sensors that collect data may be different for each device. According to the present embodiment, the accuracy of identity verification of identity authentication data and authentication method data may be improved.

In the present disclosure, the term "device identification data" is used to refer to data for identifying an identity authentication device in an identity authentication system of the present disclosure. The identity authentication system of the present disclosure may include a plurality of identity authentication devices, and device identification data may be used to identify an identity authentication device used by a person attempting identity authentication among the plurality of identity authentication devices. For example, device identification data may include one or more of a phone number, a membership number, and a resident registration number.

FIG. 1 is a block diagram for describing an identity authentication system according to an embodiment of the present disclosure.

An identity authentication device 10 performs identity authentication, based on authentication means data received from an identity authentication request device 20. The identity authentication device 10 may perform identity authentication by comparing identity authentication data stored in the identity authentication device 10 with authentication means data collected by the identity authentication request device 20. For example, the identity authentication device 10 may be a portable electronic device of a user, and the identity authentication request device 20 may be an electronic device provided at an affiliated store of a business operator providing a service that the user wishes to use. The identity authentication request device 20 may be a device that permits access only when identity authentication is performed successfully. As a specific example, the identity authentication request device 20 may be a device installed at an entrance that permits entry only to those who have completed identity authentication. As another example, the identity authentication request device 20 may be a device installed at a checkout counter to authorize payment through identity authentication. In addition, the identity authentication request device 20 may be a type of device suitable for performing an identity authentication process so as to provide various services.

The identity authentication device 10 may include a communication unit, a processor, a memory, and a sensor.

In an embodiment, the identity authentication device 10 may be a mobile electronic device. For example, the identity authentication device 10 may be implemented as a smartphone, a tablet personal computer (PC), a PC, a smart TV, a personal digital assistant (PDA), a laptop, a media player, a navigation system, a device with a camera mounted thereon, and other mobile electronic devices. In addition, the identity authentication device 10 may be implemented as a wearable device, such as a watch, glasses, a hair band, or a ring, which has a communication function and a data processing function.

The communication unit of the identity authentication device 10 allows the identity authentication device 10 to communicate with an external device (e.g., the identity authentication request device 20 or the server).

For example, the communication performed by the communication unit of the identity authentication device 10 may include long-term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), etc. For example, the communication performed by the communication unit of the identity authentication device 10 may include wireless fidelity (WiFi), Bluetooth, Bluetooth Low Energy (BLE), Zigbee, near field communication (NFC), magnetic secure transmission, radio frequency (RF), or body area network (BAN). For example, the communication performed by the communication unit may include GNSS. The GNSS may be, for example, Global Positioning System (GPS), Global Navigation Satellite System (Glonass), Beidou Navigation Satellite System, Galileo, or the European global satellite-based navigation system.

The processor of the identity authentication device 10 controls the overall operation of the identity authentication device 10. For example, the processor of the identity authentication device 10 may control the overall operation of the identity authentication device 10 by executing programs stored in the memory of the identity authentication device 10.

The processor of the identity authentication device 10 includes at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electrical units for performing functions.

The memory of the identity authentication device 10 is hardware that stores various data processed within the identity authentication device 10 and may store programs for processing and control by the processor of the identity authentication device 10. The programs may include, for example, a kernel, middleware, an application program interface (API), and/or an application program (or "application"). The memory of the identity authentication device 10 may store payment information, user information, etc.

The sensor of the identity authentication device 10 may convert measured or detected information into an electronic signal. The sensor of the identity authentication device 10 may include, for example, a gesture sensor, a biometric sensor, an olfactory (e-nose) sensor, an electromyography (EMG) sensor, an electroencephalogram (EEG) sensor, an electrocardiogram (ECG) sensor, an infrared (IR) sensor, an iris sensor, and/or a fingerprint sensor.

The sensor of the identity authentication device 10 may include a camera. The camera may be a device capable of generating still image and moving image data. The camera may include one or more image sensors (e.g., front or rear sensors), a lens, an image signal processor (ISP), or a flash (e.g., light-emitting diode (LED) or xenon lamp, etc.).

The identity authentication device 10 may further include an input/output device. The input/output device of the identity authentication device 10 may receive an input of a user of the identity authentication device 10 and convert the input of the user into an electronic signal so as to process the input of the user, or convert the electronic signal generated by the identity authentication device 10 into a signal to be provided to a user. For example, the input/output device of the identity authentication device 10 may include a touch panel, a (digital) pen sensor, a key, an ultrasonic input device, a display, or an audio module.

The identity authentication request device 20 may include a communication unit, a processor, a memory, and a sensor.

In an embodiment, the identity authentication request device 20 may be a mobile electronic device. For example, the identity authentication request device 20 may be implemented as a smartphone, a tablet PC, a PC, a smart TV, a PDA, a laptop, a media player, a navigation system, a device with a camera mounted thereon, and other mobile electronic devices. In addition, the identity authentication request device 20 may be implemented as a wearable device, such as a watch, glasses, a hair band, or a ring, which has a communication function and a data processing function.

The communication unit of the identity authentication request device 20 allows the identity authentication request device 20 to communicate with an external device (e.g., the identity authentication device 10 or the server).

For example, the communication performed by the communication unit of the identity authentication request device 20 may include LTE, LTE-A, CDMA, WCDMA, UMTS, WiBro, GSM, etc. For example, the communication performed by the communication unit of the identity authentication request device 20 may include WiFi, Bluetooth, BLE, Zigbee, NFC, magnetic secure transmission, RF, or BAN. For example, the communication performed by the communication unit may include GNSS. The GNSS may be, for example, GPS, Glonass, Beidou Navigation Satellite System, Galileo, or the European global satellite-based navigation system.

The processor of the identity authentication request device 20 controls the overall operation of the identity authentication request device 20. For example, the processor of the identity authentication request device 20 may control the overall operation of the identity authentication request device 20 by executing programs stored in the memory of the identity authentication request device 20.

The processor of the identity authentication request device 20 includes at least one of ASICs, DSPs, DSPDs, PLDs, FPGAs, controllers, micro-controllers, microprocessors, or other electrical units for performing functions.

The memory of the identity authentication request device 20 is hardware that stores various data processed within the identity authentication request device 20 and may store programs for processing and control by the processor of the identity authentication request device 20. The programs may include, for example, a kernel, middleware, an API, and/or an application program (or "application"). The memory of the identity authentication request device 20 may store payment information, user information, etc.

The sensor of the identity authentication request device 20 may convert measured or detected information into an electronic signal. The sensor of the identity authentication request device 20 may include, for example, a gesture sensor, a biometric sensor, an olfactory (e-nose) sensor, an EMG sensor, an EEG sensor, an ECG sensor, an IR sensor, an iris sensor, and/or a fingerprint sensor.

The sensor of the identity authentication request device 20 may include a camera. The camera may be a device capable of generating still image and moving image data. The camera may include one or more image sensors (e.g., front or rear sensors), a lens, an ISP, or a flash (e.g., LED or xenon lamp, etc.).

The identity authentication request device 20 may further include an input/output device. The input/output device of the identity authentication request device 20 may receive an input of a user of the identity authentication request device 20 and convert the input of the user into an electronic signal so as to process the input of the user, or convert the electronic signal generated by the identity authentication request device 20 into a signal to be provided to a user. For example, the input/output device of the identity authentication request device 20 may include a touch panel, a (digital) pen sensor, a key, an ultrasonic input device, a display, or an audio module.

Although not illustrated in FIG. 1, the identity authentication system according to an embodiment of the present disclosure may further include a server. For reasons such as ease of data storage, data distribution, design limitations, ease of design, etc., the identity authentication system may further include a server. In an embodiment, the identity authentication device 10 or the identity authentication request device 20 may transmit and receive a part of transmission/reception data through the server rather than directly therebetween.

The server may include a processor. The overall operation of the server may be controlled by the processor of the server. For example, the processor of the server may control the overall operation of the server by executing programs stored in a memory of the server.

Although not illustrated in FIG. 1, the identity authentication system according to an embodiment of the present disclosure may further include a dedicated identity authentication device. The dedicated identity authentication device is a device that is provided separately from the identity authentication device or the identity authentication request device, and may be a device that is provided individually so as to perform identity authentication without performing any other functions. When the identity authentication system includes the dedicated identity authentication device, there is an advantage of being able to perform identity authentication even when the identity authentication device or the user terminal is turned off. As described below, the dedicated identity authentication device may receive and store identity authentication data and determine whether authentication means data received thereafter matches the identity authentication data. The dedicated identity authentication device is described in detail below with reference to FIGS. 9A, 9B, and 10A to 10C.

The dedicated identity authentication device may include a processor. The overall operation of the dedicated identity authentication device may be controlled by the processor of the dedicated identity authentication device. For example, the processor of the dedicated identity authentication device may control the overall operation of the dedicated identity authentication device by executing programs stored in a memory of the dedicated identity authentication device.

On the other hand, the identity authentication device 10 may generate a signal continuously or periodically. Generating the signal continuously or periodically may be intended to enable access to the authentication system according to an embodiment of the present disclosure at any time. Specifically, a user of the identity authentication device 10 or a person attempting identity authentication through the identity authentication system according to an embodiment of the present disclosure does not intentionally initiate a series of identity authentication request procedures (or identity authentication procedures) according to the present disclosure through the identity authentication device 10 (e.g., not execute an application), and instead, the identity authentication device 10 may generate a signal continuously or periodically so that a series of identity authentication request procedures according to the present disclosure may be automatically performed when the identity authentication device 10 satisfies a specific condition (e.g., access to the identity authentication request device 20, communication connection to the identity authentication request device 20, etc.).

As a specific example, an identity authentication request method according to an embodiment of the present disclosure may be performed by interacting with an operation of an application installed on the identity authentication device 10 (e.g., a smartphone). The application may switch to a power saving mode when not executed continuously. When the application switches to the power saving mode, it may be difficult to automatically activate the application at the outside of the identity authentication device 10. Accordingly, the identity authentication device 10 of the present disclosure (or the application installed on the identity authentication device 10) may be implemented to generate a signal continuously or periodically, and thus, the activated state of the application may be maintained.

The signal generated continuously or periodically by the identity authentication device 10 may be transmitted to the server or the identity authentication request device 20. For example, the signal generated continuously or periodically may include position data, such as GPS data.

Hereinafter, a process, performed by the identity authentication system of the present disclosure, of requesting identity authentication and performing identity authentication is described in detail.

Figure 2:
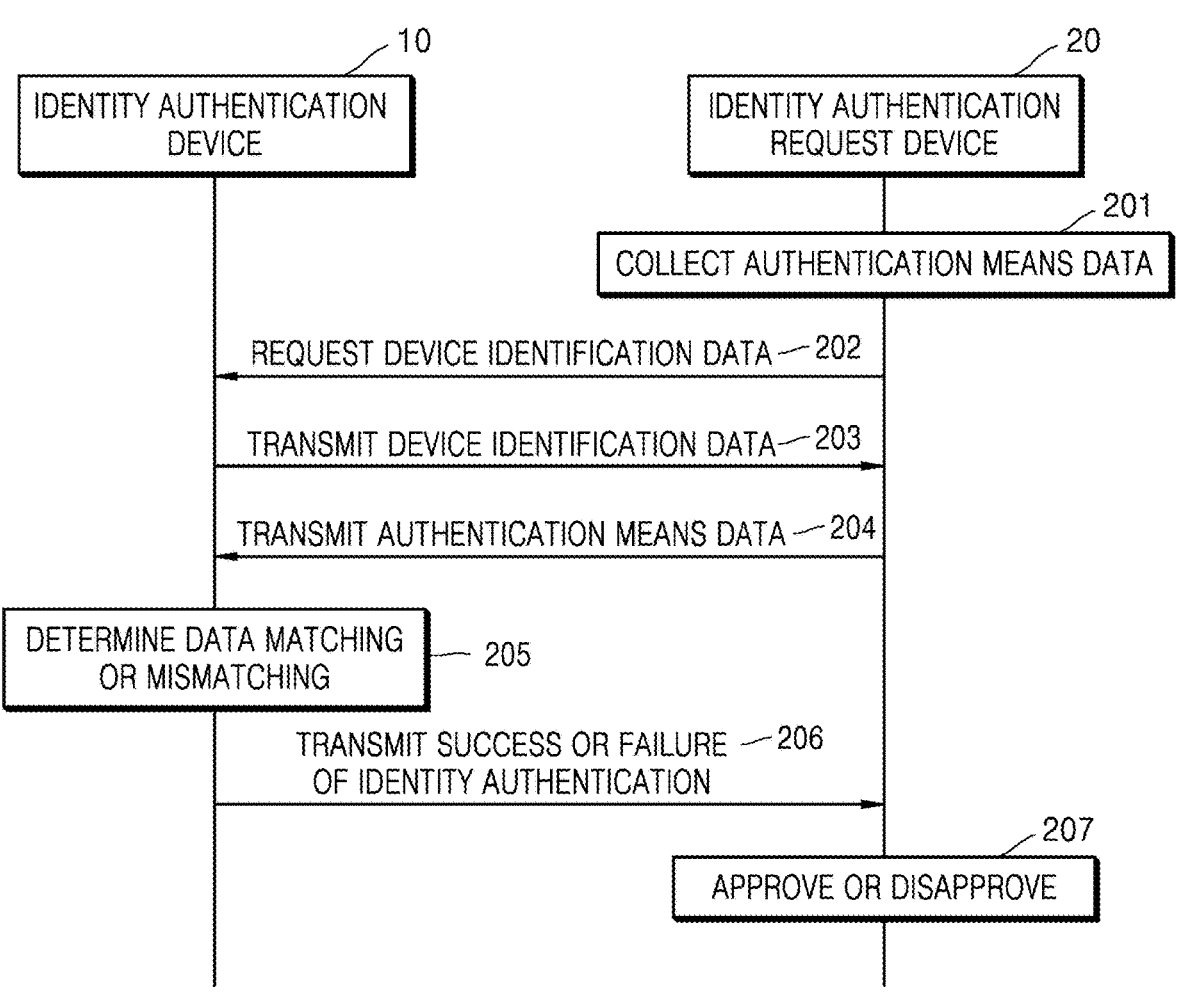
FIG. 2 is a flowchart for describing an identity authentication process according to an embodiment of the present disclosure.

FIG. 2 is a flowchart for describing an identity authentication process according to an embodiment of the present disclosure.

In the present disclosure, the identity authentication process may be performed by data transmission and reception between the identity authentication device 10 and the identity authentication request device 20.

In an embodiment, in operation 201, the identity authentication request device 20 may collect authentication means data.

In an embodiment, before operation 201 is performed, the user of the identity authentication device 10 may interact with the identity authentication request device 20 so as to input authentication means data. For example, the authentication means may be facial recognition and the identity authentication request device 20 may collect facial data as the authentication means data. In order to input the facial data, the user of the identity authentication device 10 may approach the identity authentication request device 20 and interact with the identity authentication request device 20.

In an embodiment, in operation 202, the identity authentication request device 20 may request device identification data.

In an embodiment, one or more persons may approach the identity authentication request device 20. That is, one or more devices may be detected by the identity authentication request device 20 (e.g., the sensor or the communication unit included in the identity authentication request device 20). For example, when the identity authentication request device 20 is a device installed at an entrance that permits entry, a plurality of persons may be standing in line to pass through the entrance. In this case, one or more devices may be detected by the identity authentication request device 20. When one or more devices are detected by the identity authentication request device 20, the identity authentication request device 20 may determine one of the one or more devices as the target of the device identification data request. An embodiment of determining the target of the device identification data request is described in detail below with reference to FIGS. 4 and 5.

In an embodiment, in operation 203, the identity authentication device 10 may transmit the device identification data to the identity authentication request device 20 in response to receiving a request for the identity authentication data.

In an embodiment, the identity authentication device 10 may receive an additional input of the user of the identity authentication device 10 (e.g., an input of approving data transmission) and transmit the device identification data, or may automatically transmit the device identification data in response to request for the device identification data.

In an embodiment, in operation 204, the identity authentication request device 20 may transmit the authentication means data to the identity authentication device 10.

The target to which the identity authentication request device 20 transmits the authentication means data may be determined based on the device identification data rather than being determined as the target requesting the device identification data. That is, the identity authentication request device 20 may transmit the authentication means data to a device identified by the device identification data. As a result, the identity authentication device 10 that has transmitted the device identification data receives the authentication means data transmitted by the identity authentication request device 20, but this may be a result obtained when the identity authentication process proceeds normally.

In an embodiment, a method by which the identity authentication request device 20 requests and receives the device identification data may be different from a method by which the identity authentication request device 20 transmits the authentication means data. For example, the transmission and reception of the device identification data and the transmission and reception of the authentication means data may be performed through different networks.

In an embodiment, in operation 205, the identity authentication device 10 may determine whether the received authentication means data matches the identity authentication data stored in the identity authentication device 10.

The expression "the received authentication means data matches the identity authentication data stored in the identity authentication device 10" may mean that the authentication means data collected by the identity authentication request device 20 is data associated with the user of the identity authentication device 10.

On the other hand, as described above, the identity authentication data stored in the identity authentication device 10 may be collected through the identity authentication device 10 and stored in the identity authentication device 10, or may be collected through the identity authentication request device 20 and transmitted to and stored in the identity authentication device 10.

In an embodiment, in operation 206, the identity authentication device 10 may transmit the success or failure of identity authentication to the identity authentication request device 20.

Specifically, the identity authentication device 10 may transmit a signal indicating the success of the identity authentication in response to the determination that the received authentication means data matches the identity authentication data stored in the identity authentication device 10. In contrast, the identity authentication device 10 may transmit a signal indicating the failure of the identity authentication in response to the determination that the received authentication means data does not match the identity authentication data stored in the identity authentication device 10.

In an embodiment, in operation 207, the identity authentication request device 20 may approve or disapprove access to a restricted procedure through identity authentication, based on the received signal. For example, when the identity authentication request device 20 is a device installed at an entrance that permits entry, the identity authentication request device 20 may approve entry.

Figure 3A:
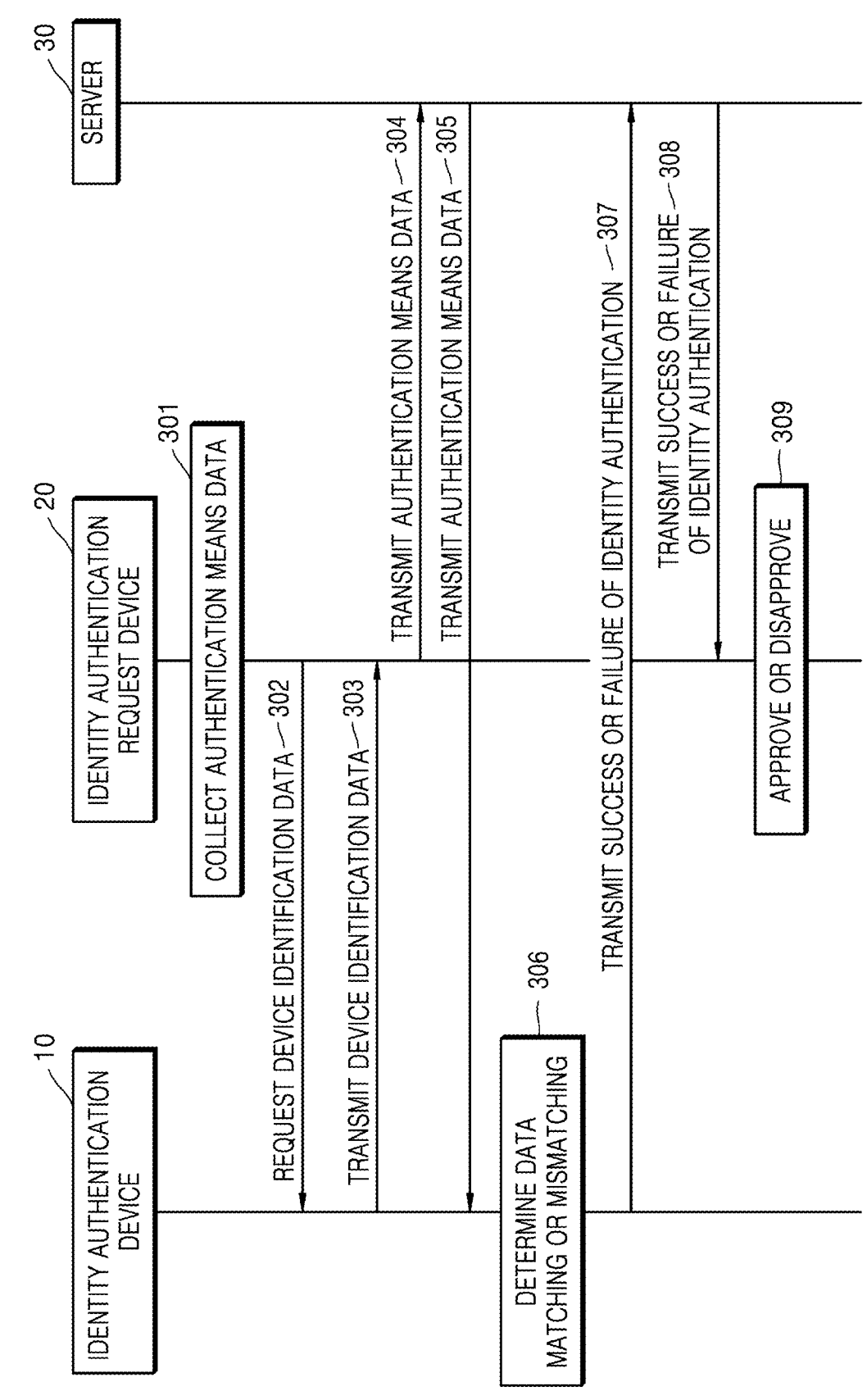
FIGS. 3A and 3B are flowcharts for describing an identity authentication process according to another embodiment of the present disclosure.
Figure 3B:
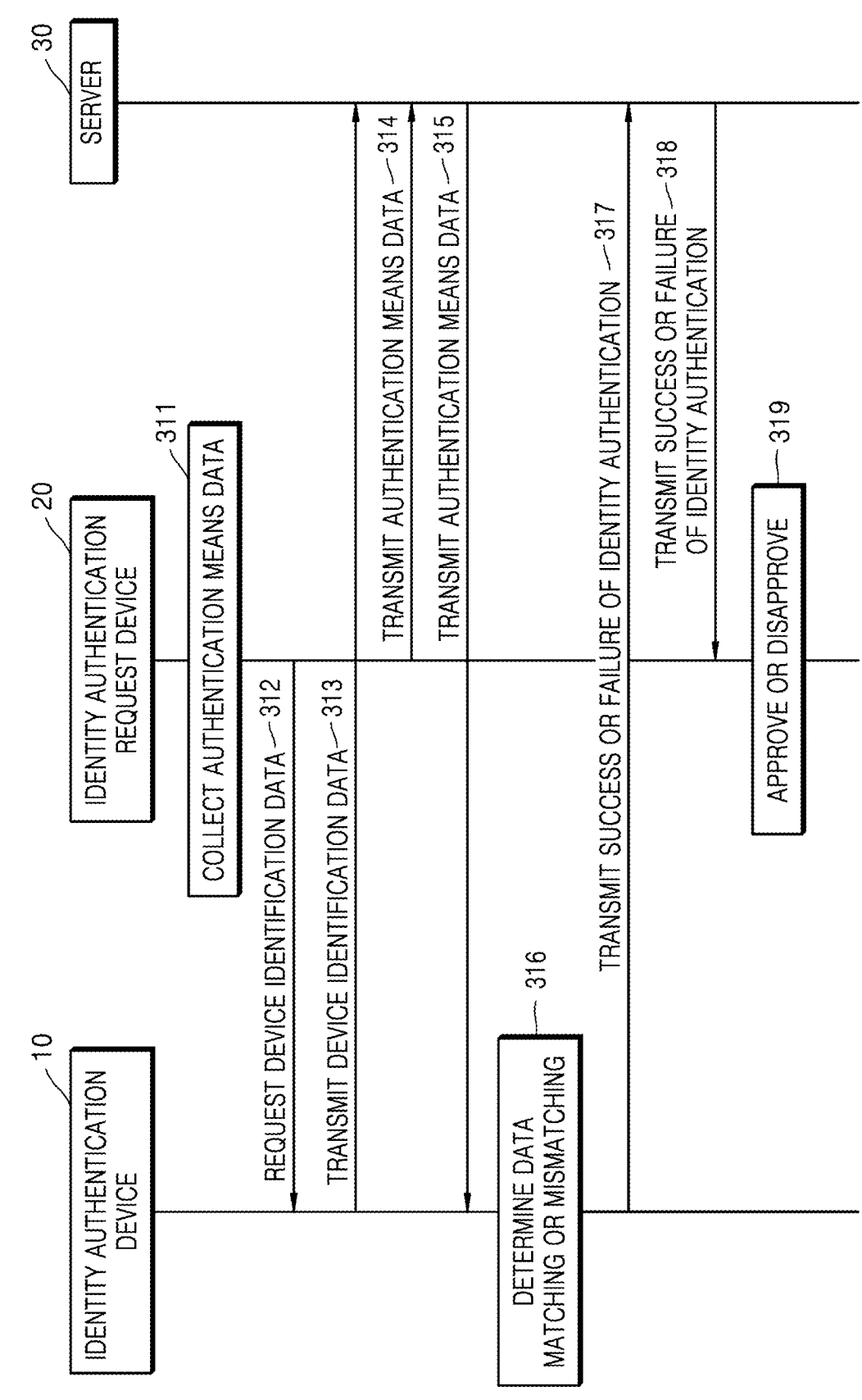

FIGS. 3A and 3B are flowcharts for describing an identity authentication process according to another embodiment of the present disclosure.

FIGS. 3A and 3B are flowcharts for describing an identity authentication process according to another embodiment of the present disclosure.

In the following description of FIG. 3A, a detailed description redundant with those provided with reference to FIG. 2 is omitted.

In an embodiment, in operation 301, the identity authentication request device 20 may collect authentication means data.

In an embodiment, in operation 302, the identity authentication request device 20 may request device identification data.

In an embodiment, in operation 303, the identity authentication device 10 may transmit the device identification data to the identity authentication request device 20 in response to receiving the request for the device identification data.

Since operations 301 to 303 may respectively correspond to operations 201 to 203 of FIG. 2, a detailed description of operations 301 to 303 is omitted.

On the other hand, in an embodiment, instead of operations 302 and 303, the server 30 may mediate the transmission and reception of the device identification data. Specifically, in an embodiment, the identity authentication request device 20 may request the device identification data from the server 30. In this case, the server 30 may request the device identification data from the identity authentication device 10. In addition, in an embodiment, the identity authentication device 10 may transmit the device identification data to the server 30. In this case, the server 30 may transmit the device identification data to the identity authentication request device 20.

In an embodiment, in operation 304, the identity authentication request device 20 may transmit the authentication means data to the server 30.

In operation 304, unlike operation 204 of FIG. 2, the target to which the identity authentication request device 20 transmits the authentication means data is the server 30. In the present embodiment, compared to a case where the identity authentication request device 20 transmits the authentication means data to the identity authentication device 10, a case where the identity authentication request device 20 transmits the authentication means data to the server 30 has an advantage in which security is enhanced and a design process is made easy.

In an embodiment, operation 304 may include transmitting, by the identity authentication request device 20, the device identification data to the server 30. Accordingly, the server 30 may identify the target to which the authentication means data is to be transmitted.

In the description provided with reference to operation 204 of FIG. 2, those applicable to operation 304 may also be implemented in operation 304 even when not separately mentioned.

In an embodiment, in operation 305, the server 30 may transmit the authentication means data to the identity authentication device 10.

In an embodiment, the server 30 may transmit the authentication means data to a device identified by the device identification data transmitted by the identity authentication request device 20.

In an embodiment, the server 30 may additionally perform a security enhancement process on the authentication means data received in operation 304.

In an embodiment, in operation 306, the identity authentication device 10 may determine whether the received authentication means data matches the identity authentication data stored in the identity authentication device 10.

Since operation 306 may correspond to operation 205 of FIG. 2, a detailed description of operation 306 is omitted.

In an embodiment, in operation 307, the identity authentication device 10 may transmit the success or failure of identity authentication to the server 30.

In operation 307, unlike operation 206 of FIG. 2, the target to which the identity authentication request device 20 transmits the success or failure of identity authentication is the server 30. In the present embodiment, compared to a case where the identity authentication request device 20 transmits the success or failure of identity authentication to the identity authentication device 10, a case where the identity authentication request device 20 transmits the success or failure of identity authentication to the server 30 has an advantage in which security is enhanced and a design process is made easy.

In the description provided with reference to operation 206 of FIG. 2, those applicable to operation 307 may also be implemented in operation 307 even when not separately mentioned.

In an embodiment, in operation 308, the server 30 may transmit the success or failure of identity authentication to the identity authentication device 10.

In an embodiment, in operation 309, the identity authentication request device 20 may approve or disapprove access to a restricted procedure through identity authentication, based on the received signal.

Since operation 309 may correspond to operation 207 of FIG. 2, a detailed description of operation 309 is omitted.

FIG. 3B is a flowchart for describing an identity authentication process according to another embodiment of the present disclosure. In the following description of FIG. 3B, a detailed description redundant with those provided with reference to FIG. 3A is omitted.

Since operations 311 and 312 may respectively correspond to operations 301 and 302 of FIG. 3A, a detailed description of operations 311 and 312 is omitted.

As a difference from the embodiment of FIG. 3A, in an embodiment, in operation 313, the identity authentication device 10 may transmit the device identification data to the server 30 in response to receiving the request for the device identification data.

As an example, the communication between the identity authentication request device 20 and the identity authentication device 10 may be unidirectional rather than bidirectional, and the identity authentication device 10 may transmit the device identification data to the server rather than the identity authentication request device 20.

In an embodiment, the identity authentication device 10 may transmit position identification data to the server 30 along with the device identification data. When the identity authentication device 10 transmits the device identification data, it may be difficult for the server 30 to know which device has transmitted the device identification data. Accordingly, the identity authentication device 10 may also transmit the position identification data to the server 30. The position identification data is data for identifying the position of the identity authentication device 10. As an example, the server 30 may identify the identity authentication device 10 by comparing the position of the identity authentication request device 20 with the position data transmitted by the identity authentication device 10. For example, the position identification data may be GPS data.

Since operation 314 may correspond to operation 304 of FIG. 3A, a detailed description of operation 314 is omitted.

In an embodiment, in operation 315, the server 30 may transmit the authentication means data to the identity authentication device 10.

In an embodiment, the server 30 may transmit the authentication means data to a device identified by the device identification data transmitted by the identity authentication device 10.

Since operations 316 to 319 may respectively correspond to operations 306 to 309 of FIG. 3A, a detailed description of operations 316 to 319 is omitted.

As described above, the identity authentication request device 20 of the present disclosure may request the device identification data and receive the device identification data. However, the number of devices that are the target for which the identity authentication request device 20 requests the device identification data may not be necessarily one.

Figure 4:
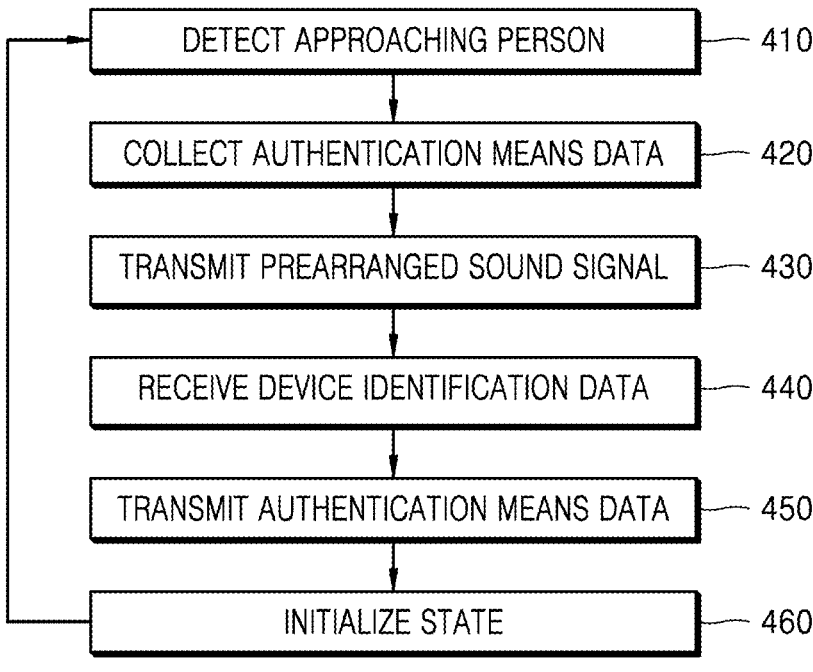
FIG. 4 is a flowchart for describing a process in which an identity authentication request device requests identity authentication when one device is detected, according to an embodiment of the present disclosure.
Figure 5:
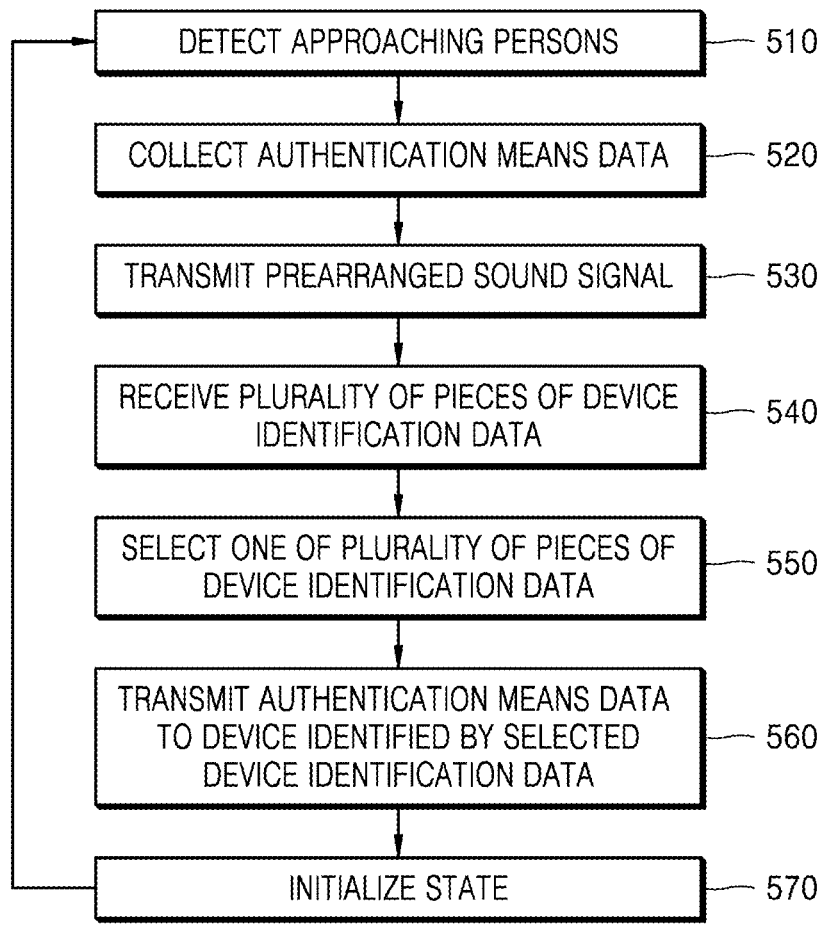
FIG. 5 is a flowchart for describing a process in which an identity authentication request device requests identity authentication when a plurality of devices are detected, according to an embodiment of the present disclosure.
Figure 6:
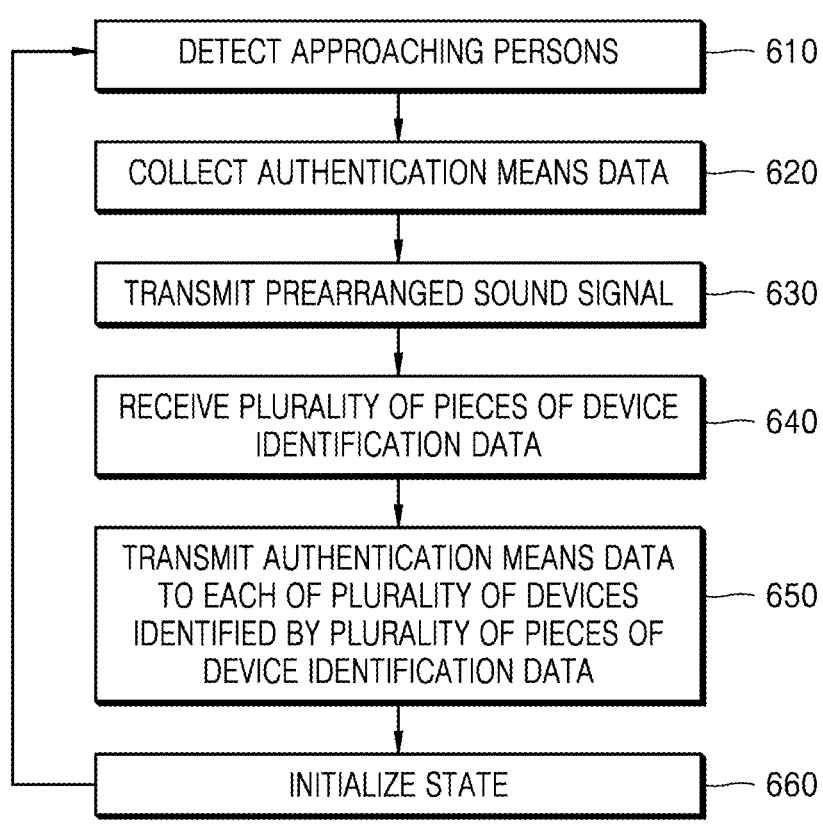
FIG. 6 is a flowchart for describing a process in which an identity authentication request device requests identity authentication when a plurality of devices are detected, according to another embodiment of the present disclosure.

FIG. 4 is a diagram for describing an embodiment in which one device is detected, and FIGS. 5 and 6 are diagrams for describing an embodiment in which a plurality of devices are detected. The processes illustrated in FIGS. 4 to 6 may be performed by the identity authentication request device 20, specifically, the processor included in the identity authentication request device 20.

FIG. 4 is a flowchart for describing a process in which the identity authentication request device requests identity authentication when one device is detected, according to an embodiment of the present disclosure.

The example illustrated in FIG. 4 is associated with an embodiment in which only one person intends to access a restricted procedure through identity authentication, like a case where only one person seeks permission for entrance.

In operation 410, the identity authentication request device 20 may detect an approaching person.

In an embodiment, the identity authentication request device 20 may detect a person approaching the identity authentication request device 20 through any suitable means. For example, the identity authentication request device 20 may detect an approaching person through the sensor of the identity authentication request device 20. For example, the sensor that detects an approaching person may be an infrared sensor, an ultrasonic sensor, a laser sensor, or the like. Operation 410 may be performed as an element that initiates subsequent operations performed by the identity authentication request device 20.

In operation 420, the identity authentication request device 20 may collect authentication means data.

Since operation 420 may correspond to operation 201 of FIG. 2 or operation 301 of FIG. 3, a detailed description of operation 420 is omitted.

In an embodiment, operation 420 may be performed independently of operation 410. That is, the identity authentication request device 20 may collect authentication means data in response to detecting an approaching person and may collect authentication means data by inputting the authentication means data, regardless of whether an approaching person is detected.

In operation 430, the identity authentication request device 20 may transmit a prearranged sound signal.

The prearranged sound signal may refer to a sound signal that may be detected by the device (e.g., the identity authentication device 10) included in the identity authentication system of the present disclosure from among the devices around the identity authentication request device 20. That is, in the present disclosure, the identity authentication device 10 may be a device that detects a sound signal and determines whether the detected sound signal is the prearranged sound signal transmitted by the identity authentication request device 20. In other words, in the identity authentication system of the present disclosure, the device that provides an identity authentication procedure may be identified through the prearranged sound signal. For example, the identity authentication device 10 may be enabled to determine whether the detected sound signal is the prearranged sound signal by installing an application distributed for use of the identity authentication system (or the identity authentication service) of the present disclosure.

In an embodiment, the prearranged sound signal may include a sound having an arbitrary frequency. That is, the identity authentication device 10 may be designed to detect a sound of a specific frequency. For example, the prearranged sound signal may include a sound having a frequency value included in an audible frequency (e.g., 20 hz to 20,000 hz). For example, the prearranged sound signal may include a sound having a frequency value that is not included in the audible frequency, such as ultrasonic waves or infrasonic waves.

In an embodiment, the prearranged sound signal may include a sound having a specific pattern. That is, the identity authentication device 10 may be designed to detect a sound of a specific pattern. For example, the specific pattern may be a pattern having a pitch of sound, that is, a pattern formed by a change in frequency. For example, the specific pattern may be a pattern having a series of beats, that is, a pattern formed by a section in which a sound is generated. For example, the specific pattern may include both the pattern formed by a change in frequency and the pattern formed by a section in which a sound is generated.

In an embodiment, the prearranged sound signal may include a sound having a volume below a certain volume. In other words, the prearranged sound signal may include only a sound having an amplitude that may be detected only by a device approaching the identity authentication request device 20.

In an embodiment, the identity authentication request device 20 may repeat transmitting the prearranged sound signal. For example, the identity authentication request device 20 may transmit the prearranged sound signal continuously or periodically. In this regard, in an embodiment, the identity authentication device 10 may be designed to determine that the detected sound signal is the prearranged sound signal only when the prearranged sound signal has a preset continuity or periodicity. In another embodiment, the identity authentication device 10 may be designed to determine that the detected sound signal is the prearranged sound signal only when the prearranged sound signal is detected a preset number of times or more.

In addition, the prearranged sound signal may include any sound designed to be detected by the identity authentication device 10 included in the identity authentication system. The prearranged sound signal may preferably be a sound signal that is unable to be easily detected by a device that is not included in the identity authentication system of the present disclosure.

In operation 440, the identity authentication request device 20 may receive device identification data.

In an embodiment, the device identification data may be data transmitted by the device that has detected the prearranged sound signal. That is, in the present disclosure, the prearranged sound signal may serve as a tool for obtaining the device identification data.

The present embodiment is an embodiment in which only one person intends to access a restricted procedure through identity authentication. Accordingly, in the present embodiment, the received device identification data may correspond to one device.

For identity authentication based on the collected authentication means data, it is necessary to verify that a person attempting identity authentication by inputting the authentication means data is the same as an owner of the identity authentication device 10. In the past, for this verification, the person attempting identity authentication (or through the administrator of the identity authentication request device 20) had to input device identification data (e.g., a phone number), which is identification information of the identity authentication device 10. However, in the present disclosure, the process in which the person attempting identity authentication manually inputs device identification data may be omitted through operations 430 and 440, that is, through the process in which the identity authentication request device 20 transmits the prearranged sound signal and receives the device identification data from the device that has detected the prearranged sound signal. Since it is unnecessary to manually input the device identification data, the time required for full identity authentication for one person may be greatly saved, and a highly satisfying experience may be provided to the user of the identity authentication system.

In operation 450, the identity authentication request device 20 may transmit the authentication means data.

In the present embodiment, as described above, the identity authentication request device 20 may transmit the authentication means data to the device identified by the device identification data. Alternatively, the identity authentication request device 20 may transmit the authentication means data to the server. Since operation 450 may correspond to operation 204 of FIG. 2 or operation 304 of FIG. 3, a detailed description of operation 450 is omitted.

In operation 460, the identity authentication request device 20 may initialize a state thereof.

In the present embodiment, initializing the state of the identity authentication request device 20 may mean deleting the device detection history or the collected authentication means data and switching to the initial state. In other words, since the identity authentication request device 20 has completed one identity authentication request by transmitting the authentication means data, the identity authentication request device 20 may switch to the initial state and prepare an identity authentication request for a next person.

In the embodiment illustrated in FIG. 4, the order in which the respective operations are performed may be changed as appropriate. For example, operation 420 may be performed after operation 440. That is, the identity authentication request device 20 may collect the authentication means data after receiving the device identification data.

FIG. 5 is a flowchart for describing a process in which the identity authentication request device requests identity authentication when a plurality of devices are detected, according to an embodiment of the present disclosure.

The example illustrated in FIG. 5 is associated with an embodiment in which a plurality of persons intend to access a restricted procedure through identity authentication, like a case where a plurality of persons seek permission for entrance.

In operation 510, the identity authentication request device 20 may detect approaching persons.

Since operation 510 may correspond to operation 410 of FIG. 4, except that a plurality of persons are detected, a detailed description of operation 510 is omitted.

In operation 520, the identity authentication request device 20 may collect authentication means data.

In the present embodiment, although a plurality of persons are detected, only one authentication means data may be collected. For example, when identity authentication is required during a payment process or an entrance control process, it is common to approve the access to the restricted procedure to one person at a time rather than to a plurality of persons at the same time. Therefore, only one authentication means data may be collected until the identity authentication is completed. That is, one collected authentication means data is maintained until the identity authentication request device 20 transmits the authentication means data in subsequent operation 560. Accordingly, what has to be solved in the present embodiment is to determine to which of the plurality of detected persons the collected authentication means data corresponds. A solution to this is described below through the description of operations 550 and 560.

In operation 530, the identity authentication request device 20 may transmit a prearranged sound signal.

Since the prearranged sound signal has been described above with reference to FIG. 4, a description of the prearranged sound signal is omitted.

In the present embodiment, since a plurality of persons are detected, each of the plurality of detected persons may possess a device, and accordingly, each of the plurality of devices may receive and detect the prearranged sound signal.

In operation 540, the identity authentication request device 20 may receive a plurality of pieces of device identification data.

In the present embodiment, as each of the plurality of devices detects the prearranged sound signal, the plurality of pieces of device identification data may include data transmitted by each of the plurality of devices.

In operation 550, the identity authentication request device 20 may select one of the plurality of pieces of device identification data.

In the present embodiment, the identity authentication request device 20 may select one of the plurality of pieces of device identification data through any suitable means. In the present embodiment, by selecting one of the plurality of pieces of device identification data, it may be determined to which of the plurality of persons the collected authentication means data corresponds.

In an embodiment, the identity authentication request device 20 may receive an input of selecting identification data and select one of the plurality of pieces of device identification data. In an embodiment, the identity authentication request device 20 may receive an input of selecting identification data through the input/output device. For example, the identity authentication request device 20 may list and display the plurality of pieces of received device identification data through the output device, and the administrator of the identity authentication request device 20 or the person attempting identity authentication may select one of the plurality of pieces of displayed device identification data through the input device. For example, when the device identification data is a phone number, a phone number of the person attempting identity authentication may be selected from among a plurality of phone numbers listed. For example, the output device and the input device may be a touch panel or the like.

In an embodiment, the identity authentication request device 20 may select one of the plurality of pieces of device identification data as device identification data corresponding to a closest device. The identity authentication request device 20 may determine the device identification data corresponding to the closest device from among the plurality of pieces of device identification data through any suitable means.

In operation 560, the identity authentication request device 20 may transmit the authentication means data to a device identified by the selected device identification data.

Similar to operation 450 of FIG. 4, the identity authentication request device 20 may transmit the authentication means data. Since the device identification data selected in operation 550 corresponds to the person attempting identity authentication, the authentication means data may be transmitted to the device identified by the selected device authentication data. Alternatively, the identity authentication request device 20 may transmit the authentication means data and the selected device identification data to the server. In addition, since operation 560 may correspond to operation 204 of FIG. 2 or operation 304 of FIG. 3, a detailed description of operation 560 is omitted.

In operation 570, the identity authentication request device 20 may initialize a state thereof.

Since operation 570 may correspond to operation 460 of FIG. 4, a detailed description of operation 570 is omitted.

In the embodiment illustrated in FIG. 5, the order in which the respective operations are performed may be changed as appropriate. For example, operation 520 may be performed after operation 540. That is, the identity authentication request device 20 may collect the authentication means data after receiving the plurality of pieces of device identification data.

FIG. 6 is a flowchart for describing a process in which the identity authentication request device requests identity authentication when a plurality of devices are detected, according to another embodiment of the present disclosure.

Similar to the example of FIG. 5, the example illustrated in FIG. 6 is associated with an embodiment in which a plurality of persons intend to access a restricted procedure through identity authentication, like a case where a plurality of persons seek permission for entrance.

In operation 610, the identity authentication request device 20 may detect approaching persons.

In operation 620, the identity authentication request device 20 may collect authentication means data.

In operation 630, the identity authentication request device 20 may transmit a prearranged sound signal.

In operation 640, the identity authentication request device 20 may receive a plurality of pieces of device identification data.

Since operations 610 to 640 may respectively correspond to operation 510 to 540 of FIG. 5, a detailed description of operations 610 to 640 is omitted.

In operation 650, the identity authentication request device 20 may transmit the authentication means data to each of a plurality of devices identified by the plurality of pieces of device identification data.

Unlike the embodiment described with reference to FIG. 5, the embodiment of FIG. 6 may use all of the plurality of pieces of received device identification data, instead of the process of selecting one of the plurality of pieces of device identification data. In the present embodiment, since the identity authentication request device 20 transmits the authentication means data to each of the plurality of devices respectively identified by the plurality of pieces of device identification data, the plurality of devices may receive the authentication means data. However, since the authentication means data received by each of the plurality of devices are identical to each other and the authentication means data are data regarding one person, identity authentication may be successfully performed only through one device.

That is, after the identity authentication device 10 receives the authentication means data, the identity authentication device 10 determines whether the received authentication means data matches the identity authentication data stored in the identity authentication device 10 and transmits the success or failure of the identity authentication to the identity authentication request device 20 (or to the identity authentication request device 20 through the server 30). The maximum number of signals indicating successful identity authentication that may be received in response to one piece of authentication means data collected by the identity authentication request device 20 is one. Accordingly, the problem of determining to which of the plurality of persons the collected authentication means data corresponds may be solved.

In operation 660, the identity authentication request device 20 may initialize a state thereof.

Since operation 660 may correspond to operation 570 of FIG. 5, a detailed description of operation 660 is omitted.

Figure 7:
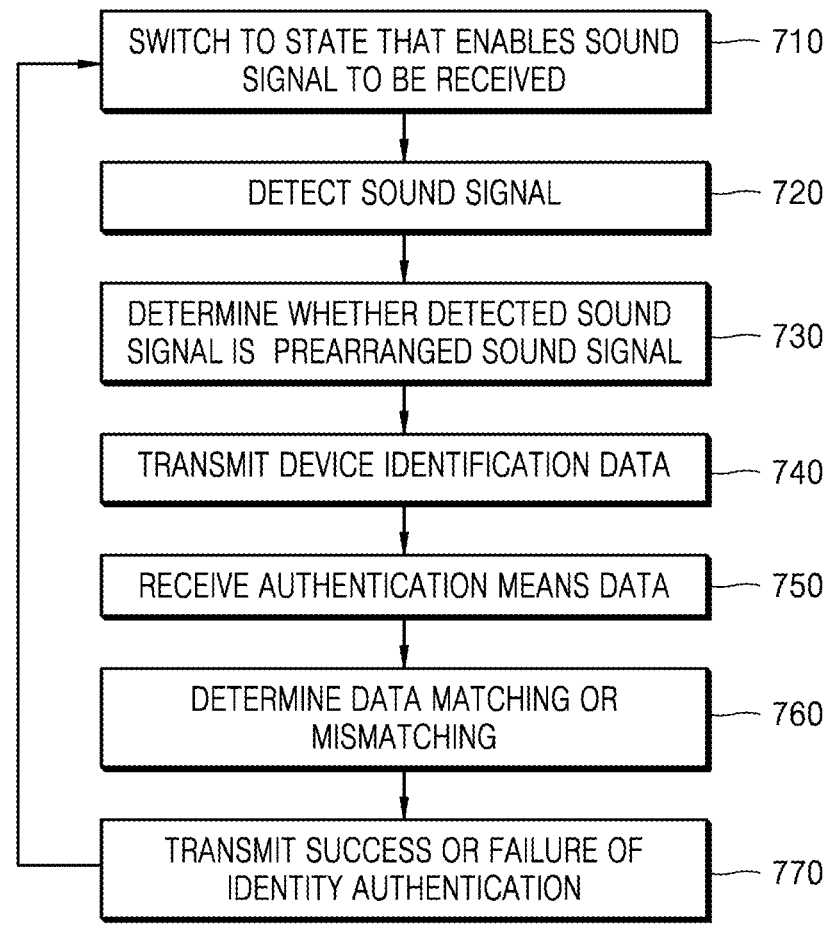
FIG. 7 is a flowchart for describing a process in which an identity authentication device performs identity authentication, according to an embodiment of the present disclosure.

FIG. 7 is a flowchart for describing a process in which the identity authentication device performs identity authentication, according to an embodiment of the present disclosure.

The process illustrated in FIG. 7 may be performed by the identity authentication device 10, specifically, the processor included in the identity authentication device 10.

In operation 710, the identity authentication device 10 may switch to a state that enables a sound signal to be received.

In the present disclosure, in operation 710, in order to detect the sound signal, the identity authentication device 10 may change the state of the identity authentication device 10 to a state that enables the sound signal to be received. For example, the identity authentication device 10 may turn on a microphone function through an application distributed and installed on the identity authentication device 10.

In the present disclosure, the identity authentication device 10 may switch the state of the identity authentication device 10 to a state that enables the sound signal to be received by being triggered by any suitable means. In an embodiment, the identity authentication device 10 may switch the state of the identity authentication device 10 in response to detecting that the identity authentication device 10 approaches the identity authentication request device 20. In an embodiment, the identity authentication device 10 may detect that the identity authentication device 10 approaches the identity authentication request device 20 by any suitable means. For example, the identity authentication device 10 may include a global positioning system (GPS) sensor and may detect that the identity authentication device 10 approaches the identity authentication request device 20 through the GPS sensor.

In operation 720, the identity authentication device 10 may detect the sound signal.

In an embodiment, the identity authentication device 10 may detect the sound signal through the input/output device included in the identity authentication device 10.

In operation 730, the identity authentication device 10 may determine whether the detected sound signal is a prearranged sound signal.

Since the prearranged sound signal has been described above with reference to FIG. 4, a description of the prearranged sound signal is omitted.

In operation 740, when the identity authentication device 10 determines that the detected sound signal is the prearranged sound signal, the identity authentication device 10 may transmit device identification data.

In the present disclosure, the prearranged sound signal may be a trigger that causes a device that detects the prearranged sound signal to transmit identification data.

Since the transmission of the device identification data has been described above, a detailed description of the transmission of the device identification data is omitted.

In operation 750, the identity authentication device 10 may receive authentication means data.

In an embodiment, the identity authentication device 10 may receive the authentication means data from the identity authentication request device 20 or the server 30. Since the reception of the authentication means data has been described above, a detailed description of the reception of the authentication means data is omitted.

In operation 760, the identity authentication device 10 may determine whether the received authentication means data matches the identity authentication data stored in the identity authentication device 10.

In operation 770, the identity authentication device 10 may transmit the success or failure of identity authentication to the identity authentication request device 20.

Since operations 760 and 770 may respectively correspond to operations 205 and 206 of FIG. 2, a detailed description of operations 760 and 770 is omitted.

Figure 8:
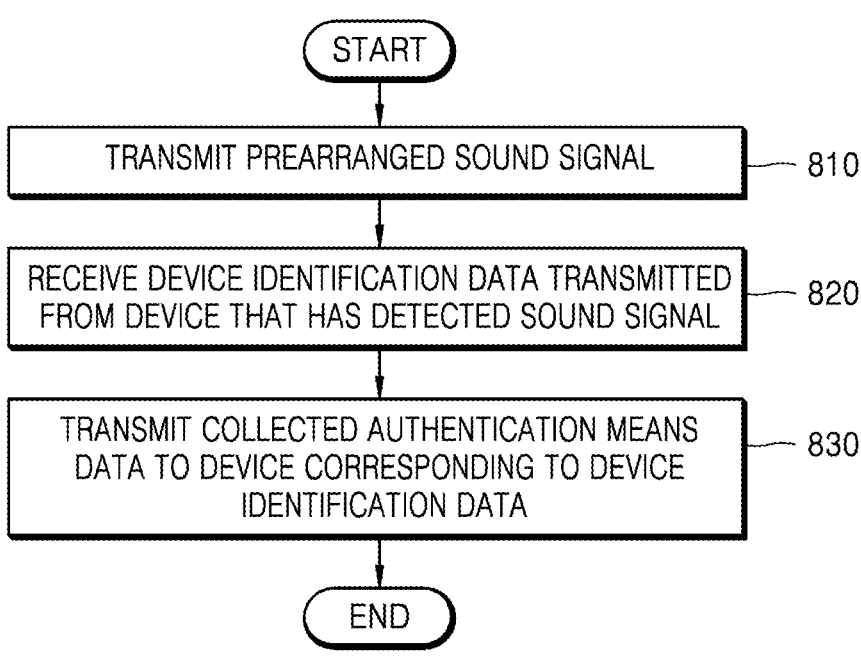
FIG. 8 is a flowchart of an identity authentication request method according to an embodiment of the present disclosure.

FIG. 8 is a flowchart of an identity authentication request method according to an embodiment of the present disclosure.

Operations illustrated in FIG. 8 may be performed by the identity authentication request device 20 described above. Specifically, the operations illustrated in FIG. 8 may be performed by the processor included in the identity authentication request device 20 described above.

In operation 810, the identity authentication request device 20 may transmit a prearranged sound signal.

Prior to operation 810, the identity authentication request device 20 may detect an approaching person and collect authentication means data, and the prearranged sound signal may be transmitted in response to collecting the authentication means data.

In operation 820, the identity authentication request device 20 may receive device identification data transmitted from a device that has detected the prearranged sound signal.

In an embodiment, the prearranged sound signal may include a sound having a frequency value that is not included in an audible frequency.

In an embodiment, the device identification data may include a plurality of pieces of device identification data.

In an embodiment, when the device identification data includes a plurality of pieces of device identification data, the identity authentication request device 20 may select one of the plurality of pieces of device identification data.

In an embodiment, the collected authentication means data may be transmitted to a device identified by the one selected device identification data.

In an embodiment, the process in which the identity authentication request device 20 selects one of the plurality of pieces of device identification data may include receiving an input of selecting one of the plurality of pieces of device identification data.

In an embodiment, when the device identification data includes a plurality of pieces of device identification data, operation 820 may be to transmit the collected authentication means data to each of the plurality of devices identified by the plurality of pieces of device identification data.

In operation 830, the identity authentication request device 20 may transmit the collected authentication means data to a device identified by the device identification data.

In an embodiment, after operation 830, the identity authentication request device 20 may receive the success or failure of identity authentication and may approve or disapprove access to a restricted procedure through identity authentication, based on the success or failure of identity authentication.

Hereinafter, an embodiment in which identity authentication is performed by a device other than the identity authentication device is described.

Figure 9:
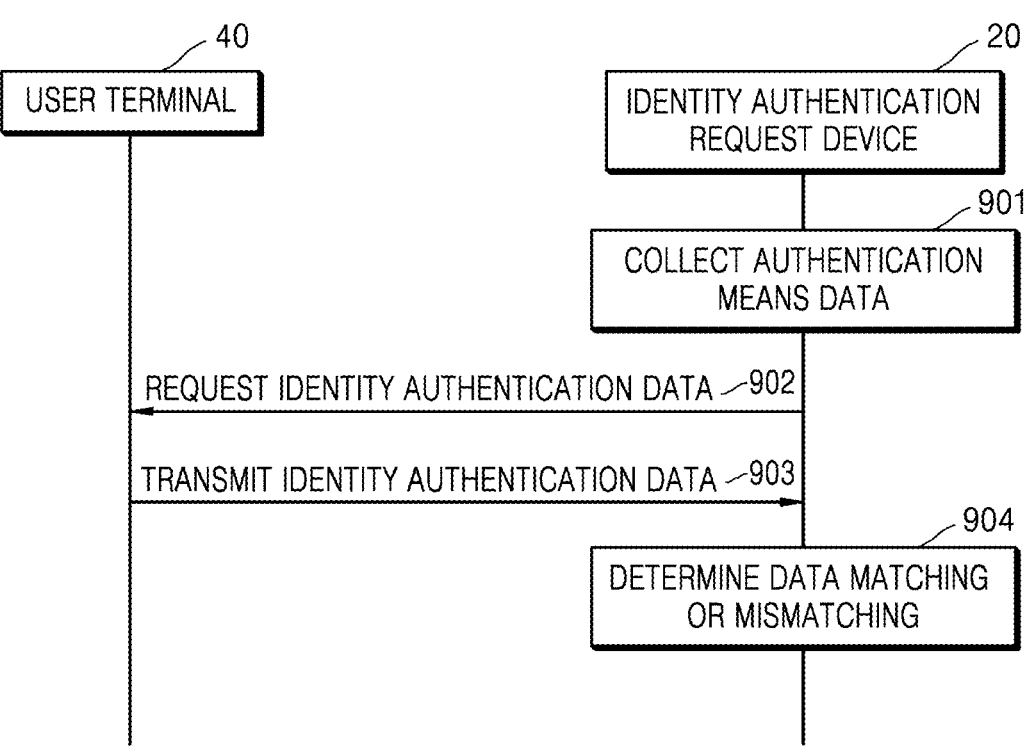
FIG. 9 is a flowchart for describing an identity authentication process according to another embodiment of the present disclosure.
Figure 10:
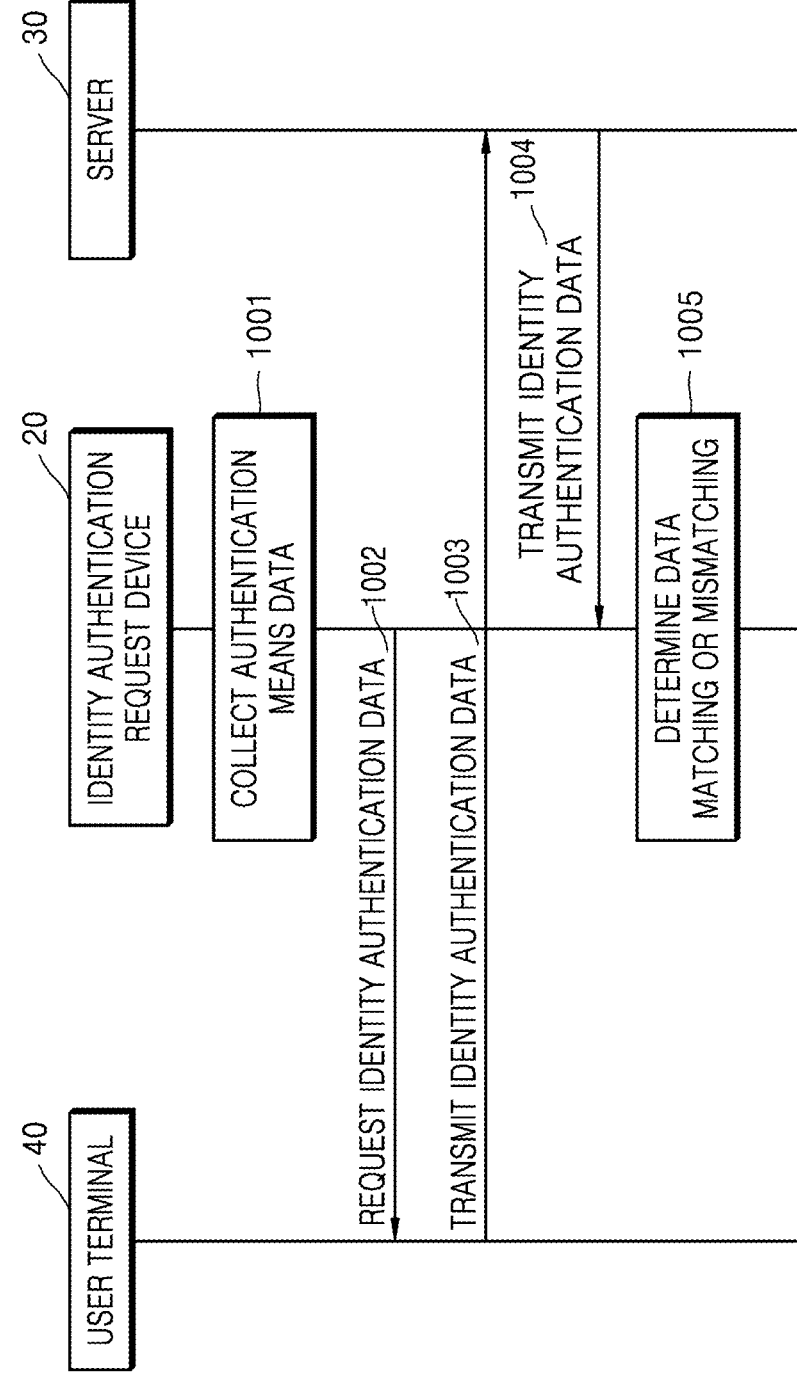
FIG. 10 is a flowchart for describing an identity authentication process according to another embodiment of the present disclosure.
Figure 11A:
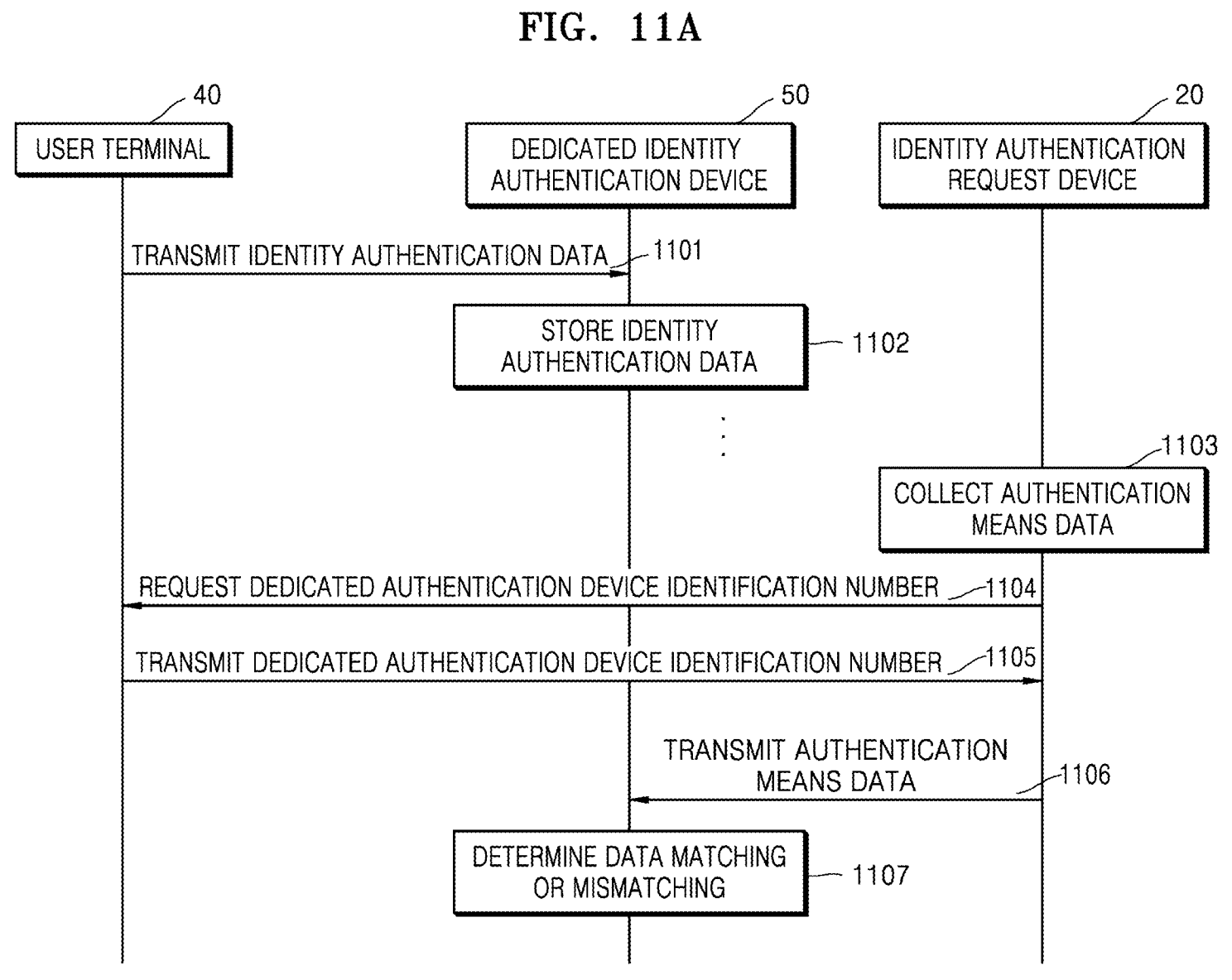
Figure 12A:
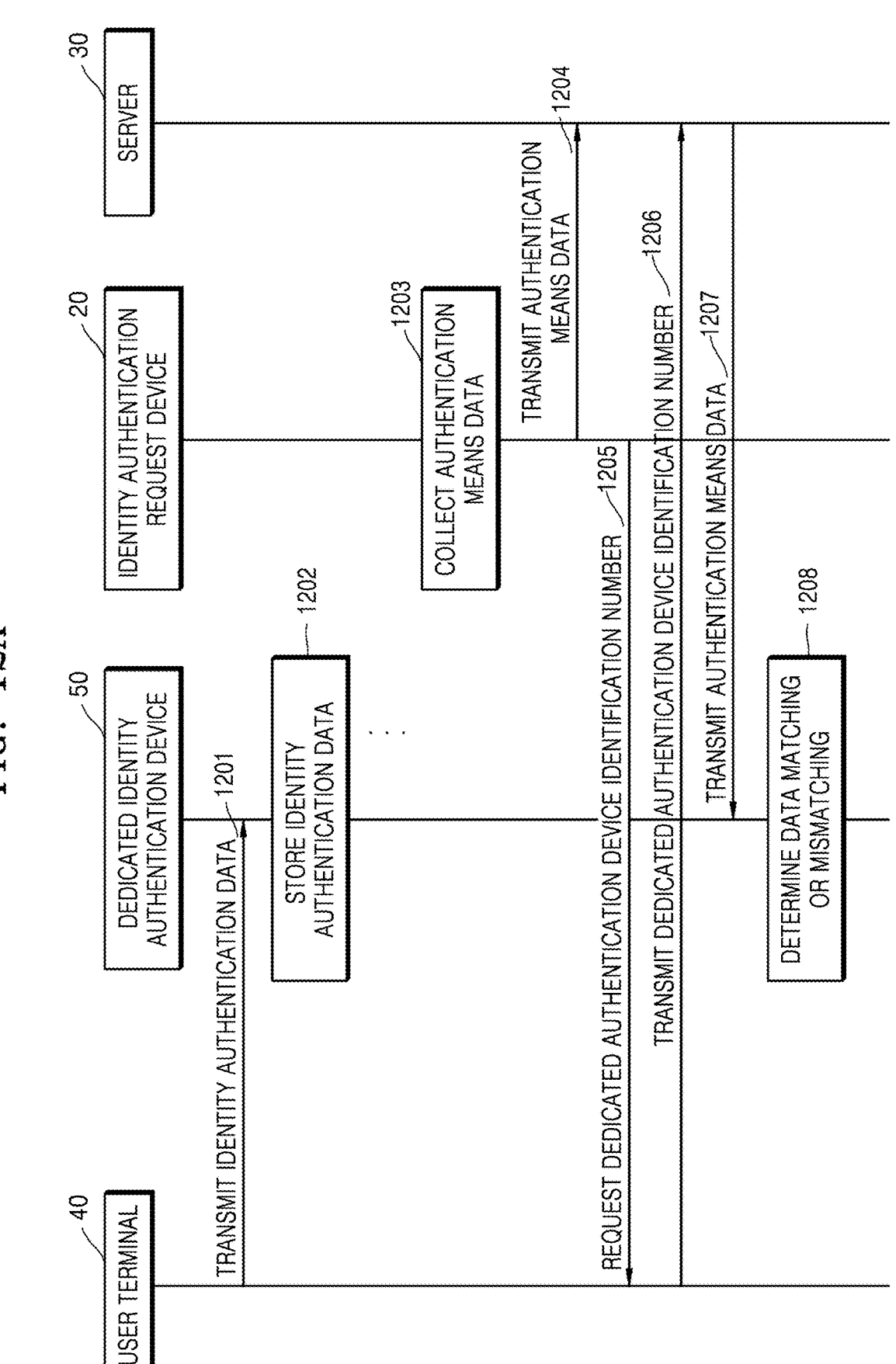
Figure 12B:
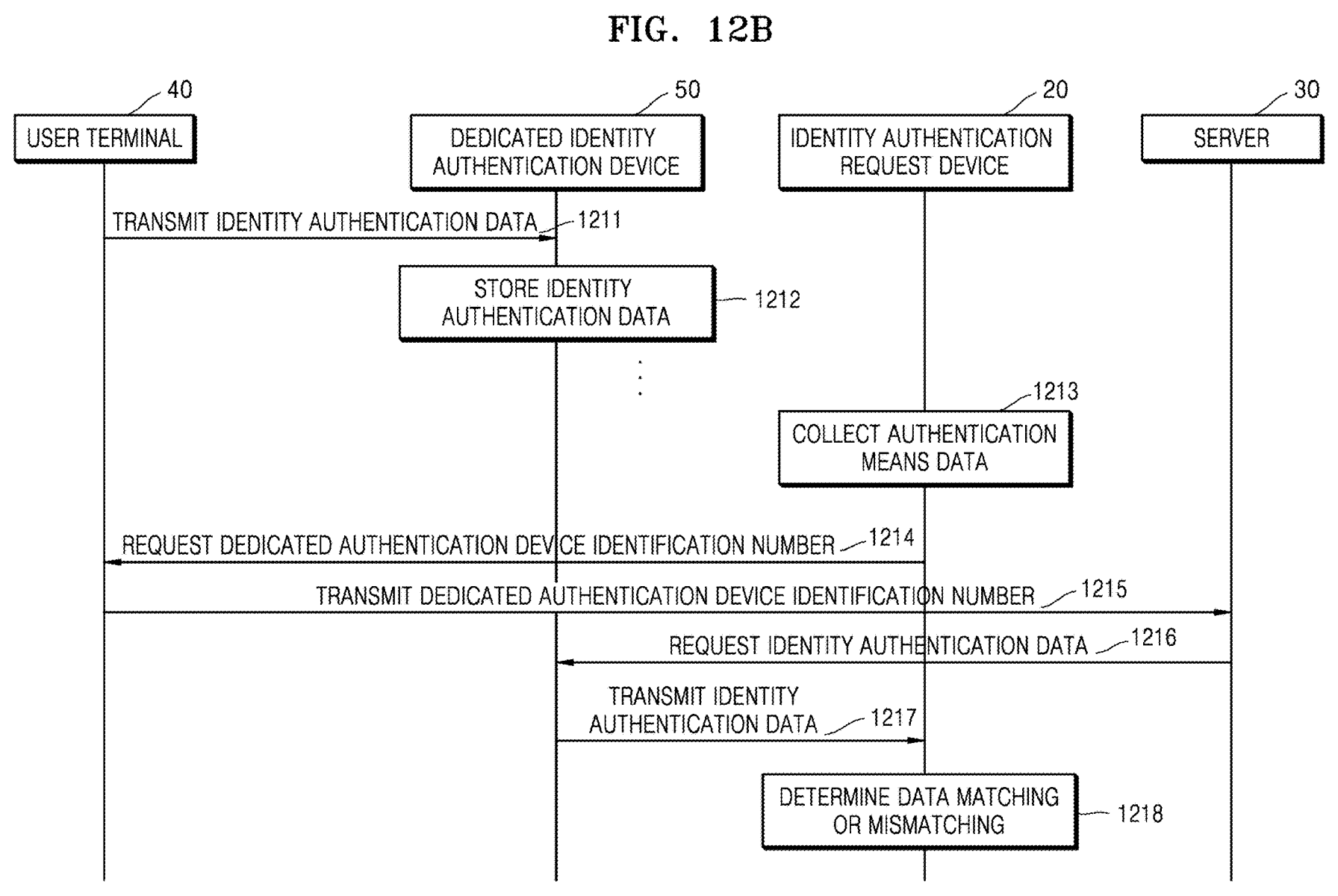
Figure 12C:
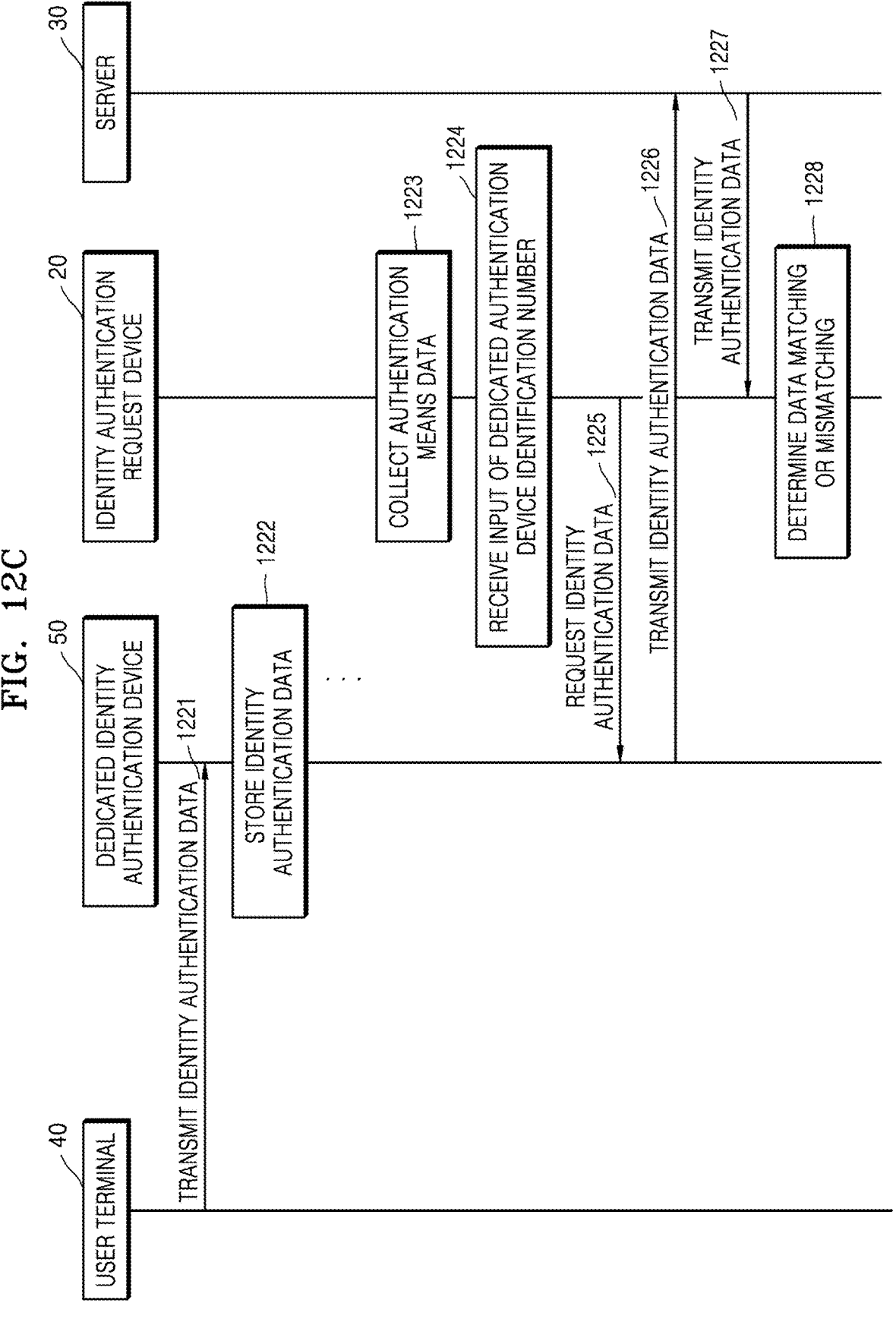

As described above, for example, the identity authentication device may be a portable electronic device of a user, and the identity authentication request device may be an electronic device provided at an affiliated store of a business operator providing a service that the user wishes to use. In the above-described embodiments, the portable electronic device of the user, that is, the identity authentication device determines whether the identity authentication data matches the authentication means data. Unlike the above-described embodiments, FIGS. 9 and 10 are associated with an embodiment in which the electronic device provided at the affiliated store of the business operator providing a service that the user wishes to use, that is, the identity authentication request device determines data matching or mismatching. In addition, FIGS. 11A and 12A are associated with an embodiment in which the identity authentication device determines data matching or mismatching, and FIGS. 11B, 12B, and 12C are associated with an embodiment in which the identity authentication request device in the identity authentication system including the dedicated identity authentication device determines data matching or mismatching.

In the embodiments described below, since the identity authentication device 10 does not perform data matching or mismatching, the term "user terminal" is used instead of the identity authentication device. However, in the practically applicable technical field, the identity authentication device described with reference to FIGS. 1 to 8 and the user terminal are substantially the same device. That is, the user terminal may be, for example, the portable electronic device of the user.

Since a part of the description of the above-described embodiments may be inferred and applied to the embodiments described below, a detailed description thereof is omitted.

FIG. 9 is a flowchart for describing an identity authentication process according to another embodiment of the present disclosure.

The identity authentication system that performs the identity authentication process described with reference to FIG. 9 may include an identity authentication request device 20 and a user terminal 40.

In an embodiment, in operation 901, the identity authentication request device 20 may collect authentication means data.

In an embodiment, in operation 902, the identity authentication request device 20 may request identity authentication data from the user terminal 40.

In an embodiment, in operation 903, the user terminal 40 may transmit identity authentication data to the identity authentication request device 20 in response to receiving the request for the identity authentication data.

In an embodiment, in operation 904, the identity authentication request device 20 may determine data matching or mismatching in response to receiving the identity authentication data.

That is, the identity authentication request device 20 may determine whether the received identity authentication data matches the collected authentication means data.

Thereafter, the identity authentication request device 20 may approve or disapprove access to a restricted procedure through identity authentication according to the determination made by the identity authentication request device 20. For example, when the identity authentication request device 20 is a device installed at an entrance that permits entry, the identity authentication request device 20 may approve entry. As another example, the identity authentication request device 20 may transmit a result of the approval or disapproval to an external device, for example, the user terminal 40.

FIG. 10 is a flowchart for describing an identity authentication process according to another embodiment of the present disclosure.

Unlike FIG. 9, FIG. 10 is associated with an embodiment in which the server 30 mediates the identity authentication process. Accordingly, the identity authentication system that may perform the identity authentication process described with reference to FIG. 10 may include an identity authentication request device 20, a server 30, and a user terminal 40.

In an embodiment, in operation 1001, the identity authentication request device 20 may collect authentication means data.

In an embodiment, in operation 1002, the identity authentication request device 20 may request identity authentication data from the user terminal 40.

In an embodiment, in operation 1003, the user terminal 40 may transmit identity authentication data to the server 30 in response to receiving the request for the identity authentication data.

In an embodiment, in operation 1004, the server 30 may transmit the identity authentication data to the identity authentication request device 20 in response to receiving the identity authentication data.

On the other hand, in another embodiment, in operation 1003, the user terminal 40 does not directly transmit the identity authentication data, but may transmit only the identification number of the user terminal 40, and in operation 1004, the server 30 may transmit previously stored identity authentication data of the user terminal 40 to the identity authentication request device 20, based on the received identification number, in response to receiving the identification number of the user terminal 40.

In an embodiment, in operation 1005, the identity authentication request device 20 may determine data matching or mismatching in response to receiving the identity authentication data.

That is, the identity authentication request device 20 may determine whether the received identity authentication data matches the collected authentication means data.

Thereafter, the identity authentication request device 20 may approve or disapprove access to a restricted procedure through identity authentication according to the determination made by the identity authentication request device 20. For example, when the identity authentication request device 20 is a device installed at an entrance that permits entry, the identity authentication request device 20 may approve entry. As another example, the identity authentication request device 20 may transmit a result of the approval or disapproval to an external device, for example, the user terminal 40.

In the embodiments described with reference to FIGS. 9 and 10, the data matching or mismatching may be determined not by transmitting the authentication means data collected by the identity authentication request device 20 but by transmitting the identity authentication data to the identity authentication request device 20. Through this method, the identity authentication speed may be further increased.

FIGS. 11A and 11B are flowcharts for describing an identity authentication process according to another embodiment of the present disclosure.

The identity authentication system that performs the identity authentication process described with reference to FIGS. 11A and 11B may include an identity authentication request device 20, a user terminal 40, and a dedicated identity authentication device 50.

FIG. 11A is associated with an embodiment in which the data matching or mismatching is determined by the dedicated identity authentication device.

Operations 1101 and 1102 may correspond to a process in which a user of the user terminal 40 stores identity authentication data in the dedicated identity authentication device 50 of the user. That is, for the identity authentication process according to the present embodiment, the user may store his/her identity authentication data in the dedicated identity authentication device 50.

In an embodiment, in operation 1101, the user terminal 40 may transmit identity authentication data to the dedicated identity authentication device 50.

In an embodiment, in operation 1102, the dedicated identity authentication device 50 may store the identity authentication data in response to receiving the identity authentication data.

The stored identity authentication data may be used for identity verification in a subsequent operation.

Thereafter, in an embodiment, in operation 1103, the identity authentication request device 20 may collect authentication means data.

In an embodiment, in operation 1104, the identity authentication request device 20 may request a dedicated authentication device identification number from the user terminal 40.

The dedicated authentication device identification number may refer to a number used to identify a dedicated identity authentication device of a specific user. The dedicated authentication device identification number may be in any format.

In an embodiment, in operation 1105, the user terminal 40 may transmit the dedicated authentication device identification number to the identity authentication request device 20 in response to receiving a request for the dedicated authentication device identification number.

In an embodiment, in operation 1106, the identity authentication request device 20 may transmit the authentication means data to the dedicated identity authentication device 50 in response to receiving the dedicated authentication device identification number.

The identity authentication request device 20 may determine the dedicated identity authentication device 50 to which the authentication means data is to be transmitted, based on the received dedicated authentication device identification number.

In an embodiment, in operation 1107, the dedicated identity authentication device 50 may determine data matching or mismatching in response to receiving the authentication means data.

That is, the dedicated identity authentication device 50 may determine whether the stored identity authentication data matches the received authentication means data.

Thereafter, in an embodiment, the dedicated identity authentication device 50 may transmit a result of the data matching or mismatching to the identity authentication request device 20. In an embodiment, the identity authentication request device 20 may approve or disapprove access to a restricted procedure through identity authentication, based on the received signal. For example, when the identity authentication request device 20 is a device installed at an entrance that permits entry, the identity authentication request device 20 may approve entry. As another example, the identity authentication request device 20 may transmit a result of the approval or disapproval to an external device, for example, the user terminal 40.

On the other hand, in an embodiment, operations 1104 and 1105 may be optional. That is, operations 1104 and 1105 may be omitted in the system according to an embodiment. In the case of the system in which operations 1104 and 1105 are omitted, the identity authentication request device 20 may receive the input of the dedicated authentication device identification number of the user of the user terminal 40 after operation 1103 or before operation 1103. For example, the user may input the dedicated authentication device identification number through an input interface provided in the identity authentication request device 20. The identity authentication request device 20 may transmit authentication means data, based on the input dedicated authentication device identification number.

FIG. 11B is associated with an embodiment in which data matching or mismatching is determined by the identity authentication request device of the identity authentication system including the dedicated identity authentication device.

Operations 1111 to 1115 may be the same as operations 1101 to 1105, respectively.

In an embodiment, in operation 1116, the identity authentication request device 20 may request the identity authentication data from the dedicated identity authentication device 50.

The identity authentication request device 20 may identify a device from which to request the identity authentication data, based on the received dedicated authentication device identification number.

In an embodiment, in operation 1117, the dedicated identity authentication device 50 may transmit the identity authentication data to the identity authentication request device 20 in response to receiving a request for the identity authentication data.

In an embodiment, in operation 1118, the identity authentication request device 20 may determine data matching or mismatching in response to receiving the identity authentication data.

That is, the identity authentication request device may determine whether the received identity authentication data matches the collected authentication means data.

Thereafter, in an embodiment, the identity authentication request device 20 may approve or disapprove access to a restricted procedure through identity authentication, based on a result of the data matching or mismatching. For example, when the identity authentication request device 20 is a device installed at an entrance that allows access, the identity authentication request device 20 may approve access. As another example, the identity authentication request device 20 may transmit a result of the approval or disapproval to an external device, for example, the user terminal 40.

On the other hand, in an embodiment, operations 1114 and 1115 may be optional. That is, operations 1114 and 1115 may be omitted in the system according to an embodiment. In the case of the system in which operations 1114 and 1115 are omitted, the identity authentication request device 20 may receive the input of the dedicated authentication device identification number of the user of the user terminal 40 after operation 1113 or before operation 1113. For example, the user may input the dedicated authentication device identification number through an input interface provided in the identity authentication request device 20. The identity authentication request device 20 may request the identity authentication data, based on the input dedicated authentication device identification number.

FIGS. 12A to 12C are flowcharts for describing an identity authentication process according to another embodiment of the present disclosure.

Unlike FIGS. 11A and 11B, FIGS. 12A to 12C are associated with an embodiment in which the server 30 mediates the identity authentication process. Accordingly, the identity authentication system that may perform the identity authentication process described with reference to FIGS. 12A to 12C may include an identity authentication request device 20, a server 30, a user terminal 40, and a dedicated identity authentication device 50.

FIG. 12A is associated with an embodiment in which the data matching or mismatching is determined by the dedicated identity authentication device.

Operations 1201, 1202, and 1203 may be the same as operations 1101, 1102, and 1103 of FIG. 11, respectively.

In an embodiment, in operation 1204, the identity authentication request device 20 may transmit the authentication means data to the server 30.

On the other hand, operation 1204 may be performed at any suitable time before operation 1207 to be described below.

In an embodiment, in operation 1205, the identity authentication request device 20 may request a dedicated authentication device identification number from the user terminal 40.

In an embodiment, in operation 1206, the user terminal 40 may transmit the dedicated authentication device identification number to the server 30 in response to receiving a request for the dedicated authentication device identification number.

In an embodiment, in operation 1207, the server 30 may transmit the authentication means data to the dedicated identity authentication device 50 in response to receiving the authentication means data and the dedicated authentication device identification number.

The server 30 may determine the dedicated identity authentication device 50 to which the authentication means data is to be transmitted, based on the received dedicated authentication device identification number.

In an embodiment, in operation 1208, the dedicated identity authentication device 50 may determine data matching or mismatching in response to receiving the authentication means data.

That is, the dedicated identity authentication device 50 may determine whether the stored identity authentication data matches the received authentication means data.

Thereafter, in an embodiment, the dedicated identity authentication device 50 may transmit a result of the data matching or mismatching to the identity authentication request device 20 or may transmit a result of the data matching or mismatching to the identity authentication request device 20 through the server 30. In an embodiment, the identity authentication request device 20 may approve or disapprove access to a restricted procedure through identity authentication, based on the received signal. For example, when the identity authentication request device 20 is a device installed at an entrance that permits entry, the identity authentication request device 20 may approve entry. As another example, the identity authentication request device 20 may transmit a result of the approval or disapproval to an external device, for example, the user terminal 40.

On the other hand, in an embodiment, operations 1205 and 1206 may be optional. That is, operations 1205 and 1206 may be omitted in the system according to an embodiment. In the case of the system in which operations 1205 and 1206 are omitted, the identity authentication request device 20 may receive the input of the dedicated authentication device identification number of the user of the user terminal 40 after operation 1203 or before operation 1203. For example, the user may input the dedicated authentication device identification number through the input interface provided in the identity authentication request device 20. The identity authentication request device 20 may transmit the input dedicated authentication device identification number to the server 30. The server 30 may transmit authentication means data, based on the received dedicated authentication device identification number.

FIG. 12B is associated with an embodiment in which data matching or mismatching is determined by the identity authentication request device of the identity authentication system including the dedicated identity authentication device.

Operations 1211, 1212, 1213, 1214, and 1215 may be the same as operations 1201, 1202, 1203, 1205, and 1206, respectively.

In an embodiment, in operation 1216, the server 30 may request identity authentication data from the dedicated identity authentication device 50.

The server 30 may identify a device from which to request the identity authentication data, based on the received dedicated authentication device identification number.

In an embodiment, in operation 1217, the dedicated identity authentication device 50 may transmit the identity authentication data to the identity authentication request device 20 in response to receiving a request for the identity authentication data.

In an embodiment, in operation 1218, the identity authentication request device 20 may determine data matching or mismatching in response to receiving the identity authentication data.

That is, the identity authentication request device may determine whether the received identity authentication data matches the collected authentication means data.

Thereafter, in an embodiment, the identity authentication request device 20 may approve or disapprove access to a restricted procedure through identity authentication, based on a result of the data matching or mismatching. For example, when the identity authentication request device 20 is a device installed at an entrance that allows access, the identity authentication request device 20 may approve access. As another example, the identity authentication request device 20 may transmit a result of the approval or disapproval to an external device, for example, the user terminal 40.

FIG. 12C is associated with another embodiment in which data matching or mismatching is determined by the identity authentication request device of the identity authentication system including the dedicated identity authentication device.

In a specific situation, it may be impossible for the identity authentication request device 20 to receive the dedicated authentication device identification number from the user terminal 40. For example, for some reasons, such as the reason that the user terminal 40 is not sufficiently close to the identity authentication request device 20, the user terminal 40 may not be able to transmit the dedicated authentication device identification number, or the identity authentication request device 20 may not be able to receive the dedicated authentication device identification number. FIG. 12C is associated with an embodiment that may solve this situation. Unlike FIG. 12A or 12B, the process of requesting the dedicated authentication device identification number or transmitting the dedicated authentication device identification number may be replaced with another process.

Operations 1221, 1222, and 1223 may be the same as operations 1211, 1212, and 1213, respectively.

In an embodiment, in operation 1224, the identity authentication request device 20 may receive the input of the dedicated authentication device identification number.

For example, the user may input the dedicated authentication device identification number through an input interface provided in the identity authentication request device 20.

In an embodiment, in operation 1225, the identity authentication request device 20 may request the identity authentication data from the dedicated identity authentication device 50.

The identity authentication request device 20 may identify a device from which to request the identity authentication data, based on the input dedicated authentication device identification number.

In an embodiment, in operation 1226, the dedicated identity authentication device 50 may transmit the identity authentication data to the server 30 in response to receiving a request for the identity authentication data.

In an embodiment, in operation 1227, the server 30 may transmit the identity authentication data to the identity authentication request device 20 in response to receiving the identity authentication data.

In an embodiment, in operation 1228, the identity authentication request device 20 may determine whether the received identity authentication data matches the collected authentication means data.

Thereafter, in an embodiment, the identity authentication request device 20 may approve or disapprove access to a restricted procedure through identity authentication, based on a result of the data matching or mismatching. For example, when the identity authentication request device 20 is a device installed at an entrance that permits entry, the identity authentication request device 20 may approve entry. As another example, the identity authentication request device 20 may transmit a result of the approval or disapproval to an external device, for example, the user terminal 40.

Figure 13:
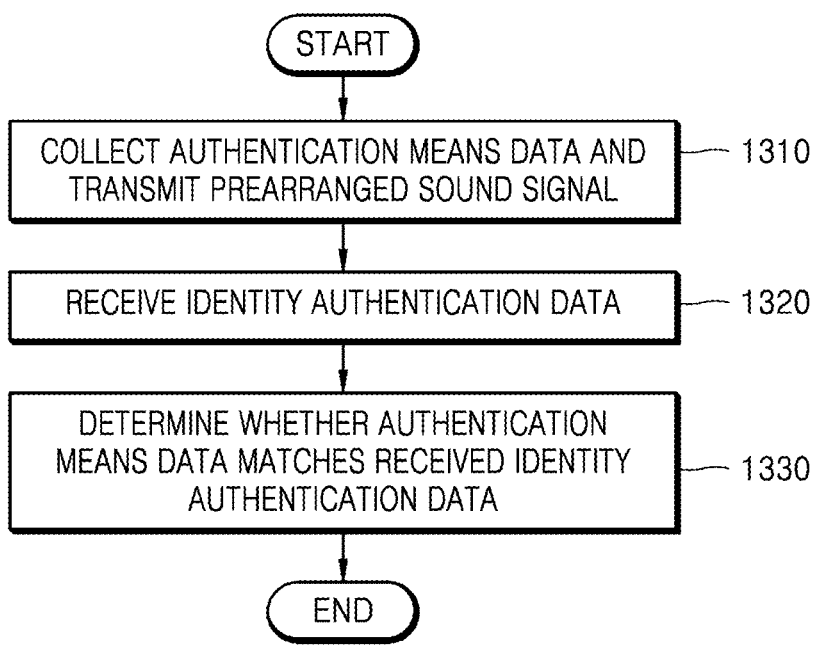
FIG. 13 is a flowchart of an identity authentication method according to an embodiment of the present disclosure.

FIG. 13 is a flowchart of an identity authentication method according to an embodiment of the present disclosure.

Operations illustrated in FIG. 13 may be performed by the identity authentication request device 20 described above, specifically, the processor of the identity authentication request device 20. The operation of the identity authentication request device 20 illustrated in FIG. 13 may be the operation of the identity authentication request device 20 of the identity authentication system described with reference to FIGS. 9 and 10. Since detailed embodiments associated with each operation have been described above, a description thereof is omitted.

In operation 1310, the identity authentication request device 20 may collect authentication means data and transmit a prearranged sound signal.

In an embodiment, the identity authentication request device 20 may receive device identification data from a device that has detected the prearranged sound signal.

The identity authentication request device 20 may identify a device to request transmission of identity authentication data, based on the received device identification data. The embodiments related to the device identification data as described above may be inferred and applied.

In an embodiment, the identity authentication request device 20 may request a device identified by the device identification data, that is, a device that has detected a sound signal, to transmit identity authentication data.

In operation 1320, the identity authentication request device 20 may receive the identity authentication data.

In an embodiment, the identity authentication request device 20 may receive the identity authentication data directly from the server or the device that has detected the prearranged sound signal.

In operation 1330, the identity authentication request device 20 may determine whether the authentication means data matches the received identity authentication data.

Figure 14:
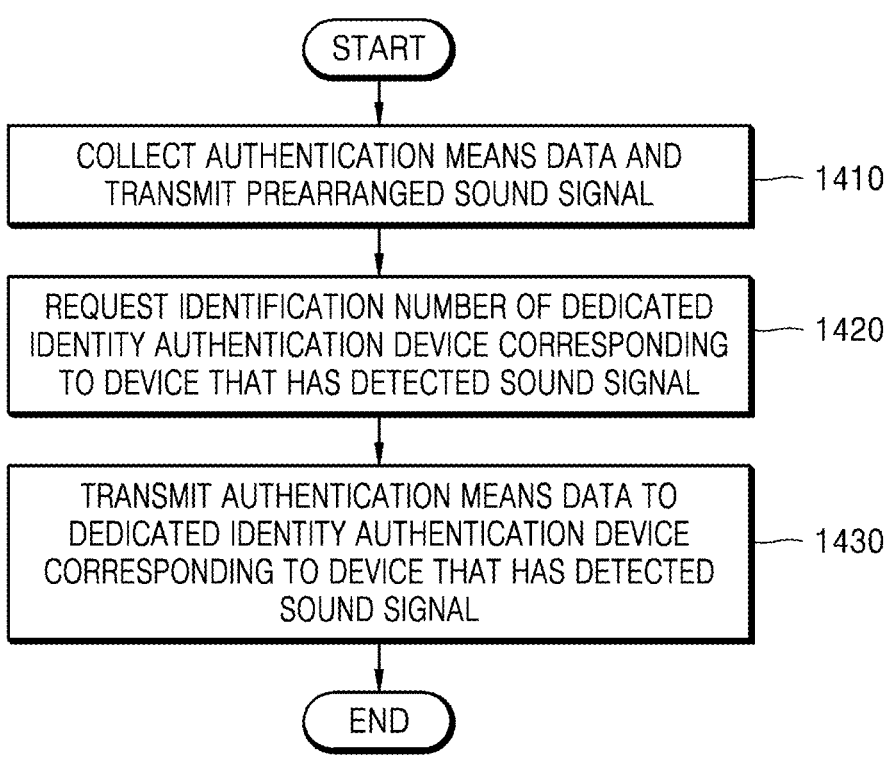
FIG. 14 is a flowchart of an identity authentication request method according to an embodiment of the present disclosure.

FIG. 14 is a flowchart of an identity authentication request method according to an embodiment of the present disclosure.

Operations illustrated in FIG. 14 may be performed by the identity authentication request device 20 described above, specifically, the processor of the identity authentication request device 20. The operation of the identity authentication request device 20 illustrated in FIG. 14 may be the operation of the identity authentication request device 20 of the identity authentication system described with reference to FIGS. 9 and 10. Since detailed embodiments associated with each operation have been described above, a description thereof is omitted.

In operation 1410, the identity authentication request device 20 may collect authentication means data and transmit a prearranged sound signal.

In an embodiment, the identity authentication request device 20 may receive device identification data from a device that has detected the prearranged sound signal.

The identity authentication request device 20 may identify a device to request transmission of the identification number of the dedicated identity authentication device, based on the received device identification data. The embodiments related to the device identification data as described above may be inferred and applied.

In operation 1420, the identity authentication request device 20 may request the identification number of the dedicated identity authentication device corresponding to the device that has detected the sound signal.

Here, the device that has detected the sound signal may be a device identified by the device identification data.

In an embodiment, the identity authentication request device 20 may receive the identification number of the dedicated identity authentication device from the server or the user terminal.

In operation 1430, the identity authentication request device 20 may transmit the authentication means data to the dedicated identity authentication device corresponding to the device that has detected the sound signal.

In an embodiment, the identity authentication request device 20 may transmit the authentication means data through the server or directly to the dedicated identity authentication device.

Figure 15:
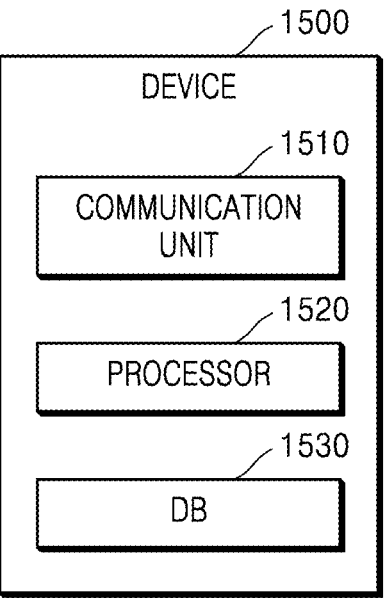
FIG. 15 is a block diagram of an identity authentication request device according to an embodiment of the present disclosure.

FIG. 15 is a block diagram of an identity authentication request device according to an embodiment of the present disclosure.

Referring to FIG. 15, an identity authentication request device 1500 may include a communication unit 1510, a processor 1520, and a database (DB) 1530. In the identity authentication request device 1500 of FIG. 15, only elements related to the embodiment are illustrated. Accordingly, it will be understood by those of ordinary skill in the art that, in addition to the elements illustrated in FIG. 15, other general-purpose elements may be included.

The communication unit 1510 may include one or more elements that enable wired/wireless communication with an external server or an external device. For example, the communication unit 1510 may include at least one of a short-range communication unit (not shown), a mobile communication unit (not shown), and a broadcasting reception unit (not shown).

The DB 1530 is hardware that stores various data processed within the identity authentication request device 1500, and may store a program for processing and control by the processor 1520. The DB 1530 may store payment information, user information, etc.

The DB 1530 may include random access memory (RAM) (e.g., dynamic random access memory (DRAM), static random access memory (SRAM), etc.), read-only memory (ROM), electrically erasable programmable read-only memory (EEPROM), compact-disc read-only memory (CD-ROM), Blu-ray or other optical disk storage, hard disk drive (HDD), solid state drive (SSD), or flash memory.

The processor 1520 controls the overall operation of the identity authentication request device 1500. For example, the processor 1520 may execute programs stored in the DB 1530 to perform overall control on an input unit (not shown), a display (not shown), the communication unit 1510, the DB 1530, etc. The processor 1520 may execute the programs stored in the DB 1530 to control the operation of the identity authentication request device 1500.

The processor 1520 may control at least a part of the operation of the identity authentication request device 1500 described with reference to FIGS. 1 to 14.

The processor 1520 includes at least one of ASICs, DSPs, DSPDs, PLDs, FPGAS, controllers, micro-controllers, microprocessors, or other electrical units for performing functions.

In an embodiment, the identity authentication request device 1500 may be a mobile electronic device. For example, the identity authentication request device 1500 may be implemented as a smartphone, a tablet PC, a PC, a smart TV, a PDA, a laptop, a media player, a navigation system, a device with a camera mounted thereon, and other mobile electronic devices. In addition, the identity authentication request device 1500 may be implemented as a wearable device, such as a watch, glasses, a hair band, or a ring, which has a communication function and a data processing function.

An identity authentication system according to an embodiment of the present disclosure may include an identity authentication request device that collects authentication means data and transmits a prearranged sound signal, and a user terminal that detects the prearranged sound signal and transmits stored identity authentication data in response to a request.

In an embodiment, the identity authentication request device may receive the identity authentication data and determine whether the authentication means data matches the identity authentication data.

In an embodiment, the identity authentication request device may collect the authentication means data in response to detecting an approaching person and transmit the prearranged sound signal in response to collecting the authentication means data.

In an embodiment, the user terminal may transmit the device identification data in response to detecting the prearranged sound signal, and the identity authentication request device may request a device identified by the device identification data to transmit the identity authentication data.

In an embodiment, when the device identification data includes a plurality of pieces of device identification data, the identity authentication request device may select one of the plurality of pieces of device identification data and request a device identified by the one selected device identification data to transmit the identity authentication data.

In an embodiment, the system may further include a server, the user terminal may transmit the identity authentication data to the server, and the server may transmit, to the identity authentication request device, the identity authentication data transmitted from the user terminal.

An identity authentication system according to an embodiment of the present disclosure may include an identity authentication request device that collects authentication means data, transmits a prearranged sound signal, and transmits the authentication means data, a user terminal that detects the prearranged sound signal and transmits an identification number of a dedicated identity authentication device in response to a request, and the dedicated identity authentication device that stores the identity authentication data received from the user terminal and determines whether the authentication means data matches the identity authentication data.

In an embodiment, the identity authentication request device may collect the authentication means data in response to detecting an approaching person, and transmit the prearranged sound signal in response to collecting the authentication means data.

In an embodiment, the user terminal may transmit the device identification data in response to detecting the prearranged sound signal, and the identity authentication request device may request the device identified by the device identification data to transmit an identification number of the dedicated identity authentication device.

In an embodiment, when the device identification data includes a plurality of pieces of device identification data, the identity authentication request device may select one of the plurality of pieces of device identification data and request a device identified by the one selected device identification data to transmit the identification number of the dedicated identity authentication device.

In an embodiment, the system may further include a server, the identity authentication request device may transmit the collected authentication means data to the server, the user terminal may transmit the identification number of the dedicated identity authentication device to the server, and the server may transmit, to the dedicated identity authentication device, the authentication means data transmitted from the identity authentication request device.

Embodiments according to the present disclosure may be implemented in the form of a computer program that may be executed through various elements on a computer, and such a computer program may be recorded on a computer-readable medium. At this time, the medium may include a magnetic medium such as hard disk, floppy disk, and magnetic tape, an optical recording medium such as CD-ROM and digital versatile disc (DVD), a magneto-optical medium such as floptical disks, and hardware devices specially configured to store and execute program instructions, such as ROM, RAM, and flash memory.

On the other hand, the computer program may be specially designed and configured for the present disclosure or may be known and available to those of ordinary skill in the art of computer software. Examples of the computer program may include not only machine language code generated by a compiler but also high-level language code that is executable using an interpreter or the like by a computer.

According to an embodiment, the methods according to various embodiments of the present disclosure may be provided by being included in a computer program product. The computer program product may be traded between a seller and a buyer as commodities. The computer program product may be distributed in the form of a machine-readable storage medium (e.g., compact disc read only memory (CD-ROM)), or may be distributed (e.g., downloaded or uploaded) online, either via an application store (e.g., Play Store™) or directly between two user devices. In the case of the online distribution, at least part of the computer program product may be stored at least temporarily on a machine-readable storage medium, such as a server of a manufacturer, a server of an application store, or a memory of a relay server, or may be temporarily generated.

Operations constituting methods according to the present disclosure may be performed in any suitable order unless otherwise indicated herein or otherwise clearly contradicted by context. The present disclosure is not necessarily limited by the order of operations. The use of any and all examples or exemplary terms (e.g., "such as") provided herein is simply intended to describe the present disclosure in detail, and the scope of the present disclosure is not limited by the examples or exemplary terms unless otherwise claimed. In addition, it will be understood by those of ordinary skill in the art that various modifications, combinations and changes may be made according to design conditions and factors within the scope of the appended claims or equivalents thereof.

Therefore, it will be understood that the spirit of the present disclosure should not be limited to the embodiments described above, and the claims and all equivalent modifications fall within the scope of the present disclosure.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

The invention claimed is:

1. An identity authentication request method comprising the steps of:
    detecting an approaching person and collecting an authentication means data;
    transmitting a prearranged sound signal, in response to collecting the authentication means data;
    receiving device identification data transmitted from a device that has detected the prearranged sound signal; and
    transmitting the collected authentication means data to a device identified by the device identification data.

2. The identity authentication request method of claim 1, further comprising the steps of:
    receiving success or failure of identity authentication; and approving or disapproving access to a restricted procedure through identity authentication, based on the success or failure of the identity authentication.

3. The identity authentication request method of claim 1, further comprising the step of, when the device identification data includes a plurality of pieces of device identification data, selecting one of the plurality of pieces of device identification data,
    wherein the collected authentication means data is transmitted to a device identified by the one selected device identification data.

4. The identity authentication request method of claim 3, wherein the step of selecting one of the plurality of pieces of device identification data comprises the step of receiving an input of selecting one of the plurality of pieces of device identification data.

5. The identity authentication request method of claim 1, wherein, when the device identification data includes a plurality of pieces of device identification data, the step of transmitting the collected authentication means data to the device identified by the device identification data comprises the step of transmitting the collected authentication means data to each of a plurality of devices identified by the plurality of pieces of device identification data.

6. The identity authentication request method of claim 1, wherein the prearranged sound signal comprises a sound having a frequency value that is not included in an audible frequency.

7. An identity authentication request device comprising:
    a memory in which at least one program is stored; and
    a processor configured to be operated by executing the at least one program,
    wherein the processor is further configured to:
    detect an approaching person and collect an authentication means data;
    transmitting a prearranged sound signal, in response to collecting the authentication means data;
    receive device identification data transmitted from a device that has detected the prearranged sound signal; and
    transmit the collected authentication means data to a device identified by the device identification data.

8. A non-transitory computer-readable recording medium having recorded thereon a program for causing a computer to perform the steps of:
    detecting an approaching person and collecting an authentication means data;
    transmitting a prearranged sound signal, in response to collecting the authentication means data;
    receiving device identification data transmitted from a device that has detected the prearranged sound signal; and
    transmitting the collected authentication means data to a device identified by the device identification data.

9. An identity authentication method comprising the steps of
    detecting an approaching person and collecting an authentication means data;
    transmitting device identification data in response to detecting a prearranged sound signal, wherein the prearranged sound signal is transmitted in response to collecting the authentication means data;
    receiving transmitted authentication means data, based on the transmitted device identification data;
    determining whether the authentication means data matches stored identity authentication data; and transmitting success or failure of identity authentication, based on the matching or mismatching.

\* \* \* \* \*